US005592592A

United States Patent [19]
Shu

[11] Patent Number: 5,592,592
[45] Date of Patent: Jan. 7, 1997

[54] METHOD AND APPARATUS FOR MINIMIZING ARTIFACTS IN IMAGES PRODUCED BY ERROR DIFFUSION HALFTONING UTILIZING INK REDUCTION PROCESSING

[75] Inventor: Joseph S. Shu, San Jose, Calif.

[73] Assignee: Seiko Epson Corporation, Tokyo, Japan

[21] Appl. No.: 320,537

[22] Filed: Oct. 11, 1994

Related U.S. Application Data

[63] Continuation-in-part of Ser. No. 269,708, Jul. 1, 1994.
[51] Int. Cl.⁶ .................................................. G06K 15/00
[52] U.S. Cl. ..................... 395/109; 358/456; 358/454; 382/252
[58] Field of Search .................................. 395/109, 101; 358/454, 455, 456, 463, 447, 298, 534, 502; 382/252, 498, 499, 275, 270, 269, 304

[56] References Cited

U.S. PATENT DOCUMENTS

| | | | |
|---|---|---|---|
| 4,533,928 | 8/1985 | Sugiura et al. | 358/502 |
| 4,654,721 | 3/1987 | Goertzel et al. | 358/459 |
| 4,855,752 | 8/1989 | Bergstedt | 358/502 |
| 4,943,813 | 7/1990 | Palmer et al. | 347/105 |
| 4,953,013 | 8/1990 | Tsuji et al. | 358/453 |
| 4,955,065 | 9/1990 | Ulichney | 358/456 |
| 4,958,238 | 9/1990 | Katayama et al. | 358/456 |
| 4,967,203 | 10/1990 | Doan et al. | 358/502 |
| 4,999,646 | 3/1991 | Trask | 347/43 |
| 5,051,841 | 9/1991 | Bowers et al. | 358/455 |
| 5,087,981 | 2/1992 | Ng et al. | 358/489 |
| 5,107,346 | 4/1992 | Bowers et al. | 358/455 |
| 5,140,432 | 7/1992 | Chan | 358/455 |
| 5,243,444 | 9/1993 | Fan | 358/455 |
| 5,258,854 | 11/1993 | Eschbach | 358/455 |
| 5,260,810 | 11/1993 | Kanno et al. | 358/455 |
| 5,268,774 | 12/1993 | Eschbach | 358/466 |
| 5,270,728 | 12/1993 | Lund et al. | 346/1.1 |
| 5,291,309 | 3/1994 | Semasa | 358/455 |
| 5,307,426 | 4/1994 | Kanno | 358/456 |
| 5,313,287 | 5/1994 | Barton | 358/458 |
| 5,313,533 | 5/1994 | Scott | 358/465 |
| 5,343,309 | 8/1994 | Roetling | 358/455 |
| 5,363,213 | 11/1994 | Coward et al. | 358/455 |

FOREIGN PATENT DOCUMENTS

| | | |
|---|---|---|
| 3151762 | 6/1991 | Japan . |
| 451773 | 2/1992 | Japan . |
| 437256 | 2/1992 | Japan . |

OTHER PUBLICATIONS

*Angling for Color*, B. Fraser, Publish Jun. (1991) pp. 74–82.
Society for Information Display Intern. Symposium Digest of Technical Papers vol. XXV, San Jose, CA, Jun. 14–16, (1994); *Adaptive Error Diffusion for Multiresolution Rendering*, P. W. Wong, pp. 801–804.
Society for Information Display Intern. Symposium Digest of Technical Papers vol. XXV, San Jose, CA, Jun. 14–16, (1994); *An Efficient Implementation for Stochastic DBS*, T. J. Flohr et al. pp. 797–800.
Society for Information Display Intern. Symposium Digest of Technical Papers vol. XXV, San Jose, Ca, Jun. 14–16, (1994); *The Blue–Noise Mask and Its Comparison with Error Diffusion in Color Halftoning*, M. Yao et al., pp. 805–808.

*Primary Examiner*—Edward L. Coles, Sr.
*Assistant Examiner*—Tracy M. Legree
*Attorney, Agent, or Firm*—Eric B. Janofsky

[57] ABSTRACT

An image preprocessing method and apparatus processes image data line-by-line using an error diffusion or dithering process to generate a halftoned image in which the radius of a dot representing a pixel is /dpi≦r≦√2/dpi The method and apparatus selectively performs the halftone process on every other pixel to reduce in consumption and computation time while maintaining a high resolution.

20 Claims, 18 Drawing Sheets

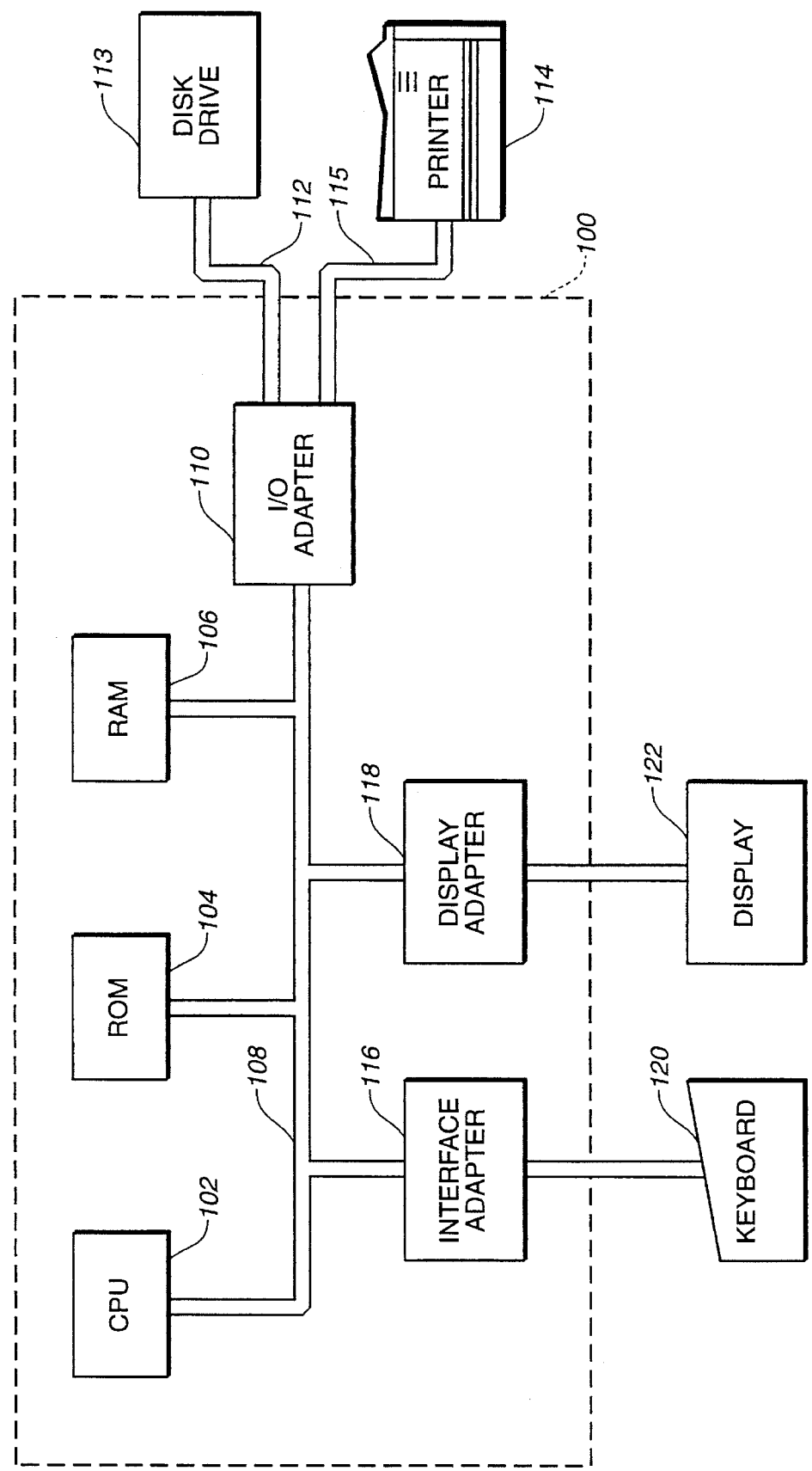
FIG._1

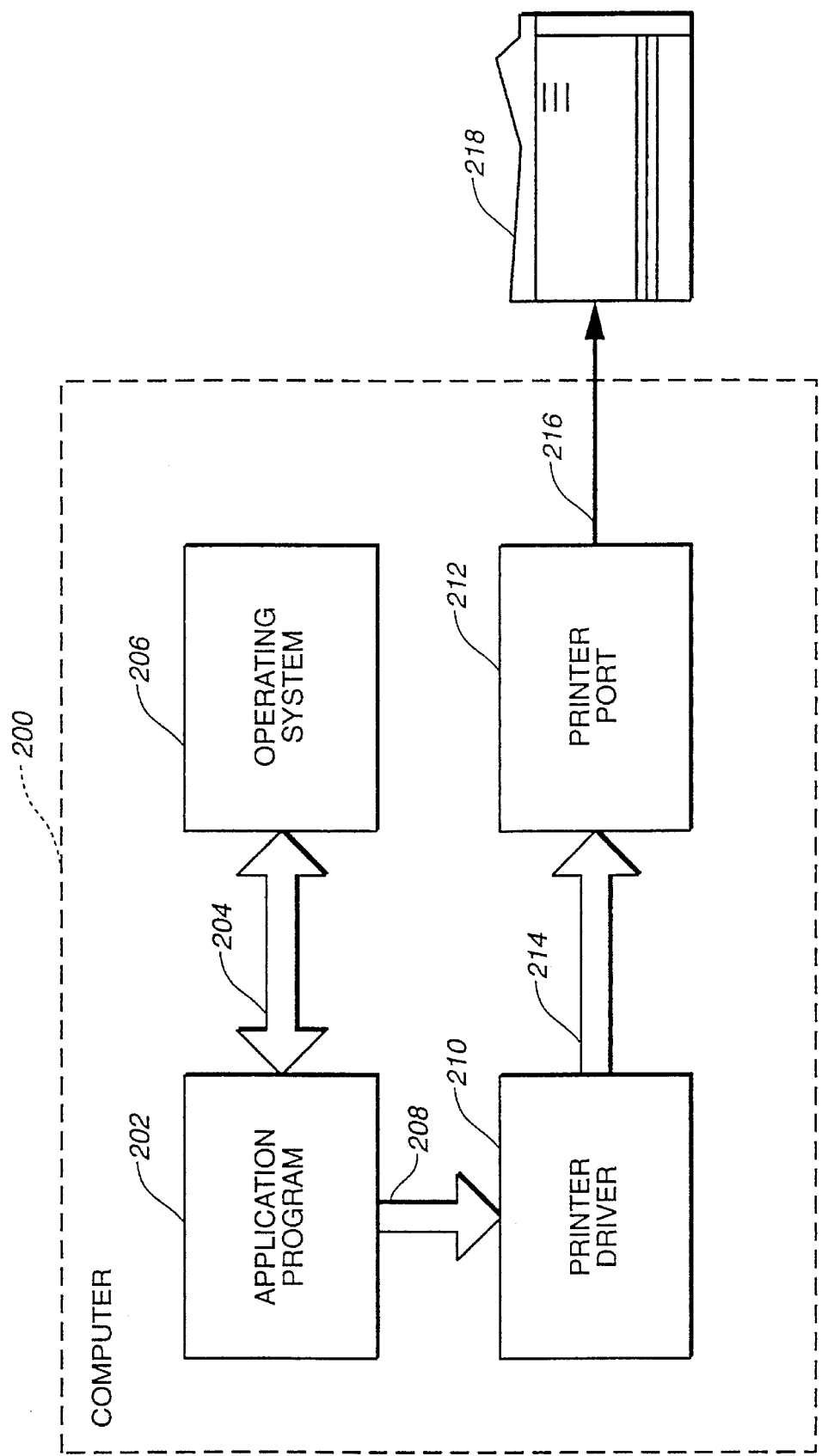
FIG._2 (PRIOR ART)

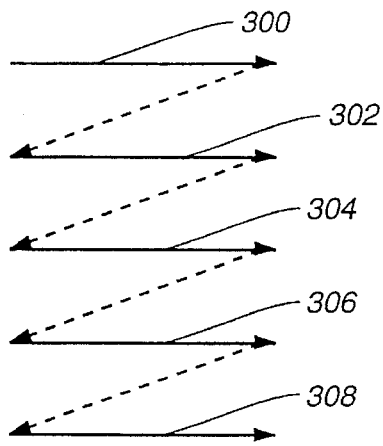
FIG._3
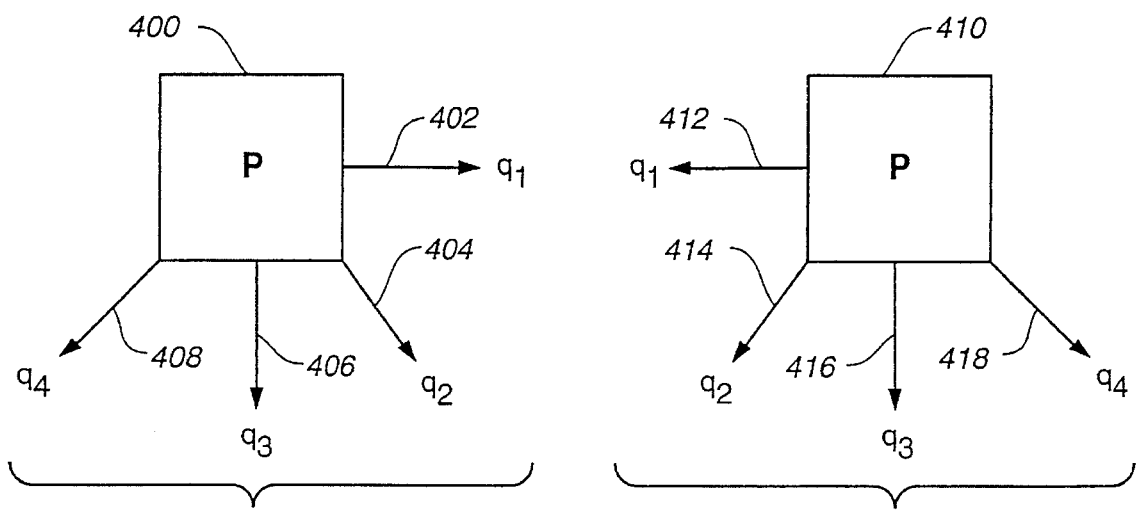
FIG._4A          FIG._4B

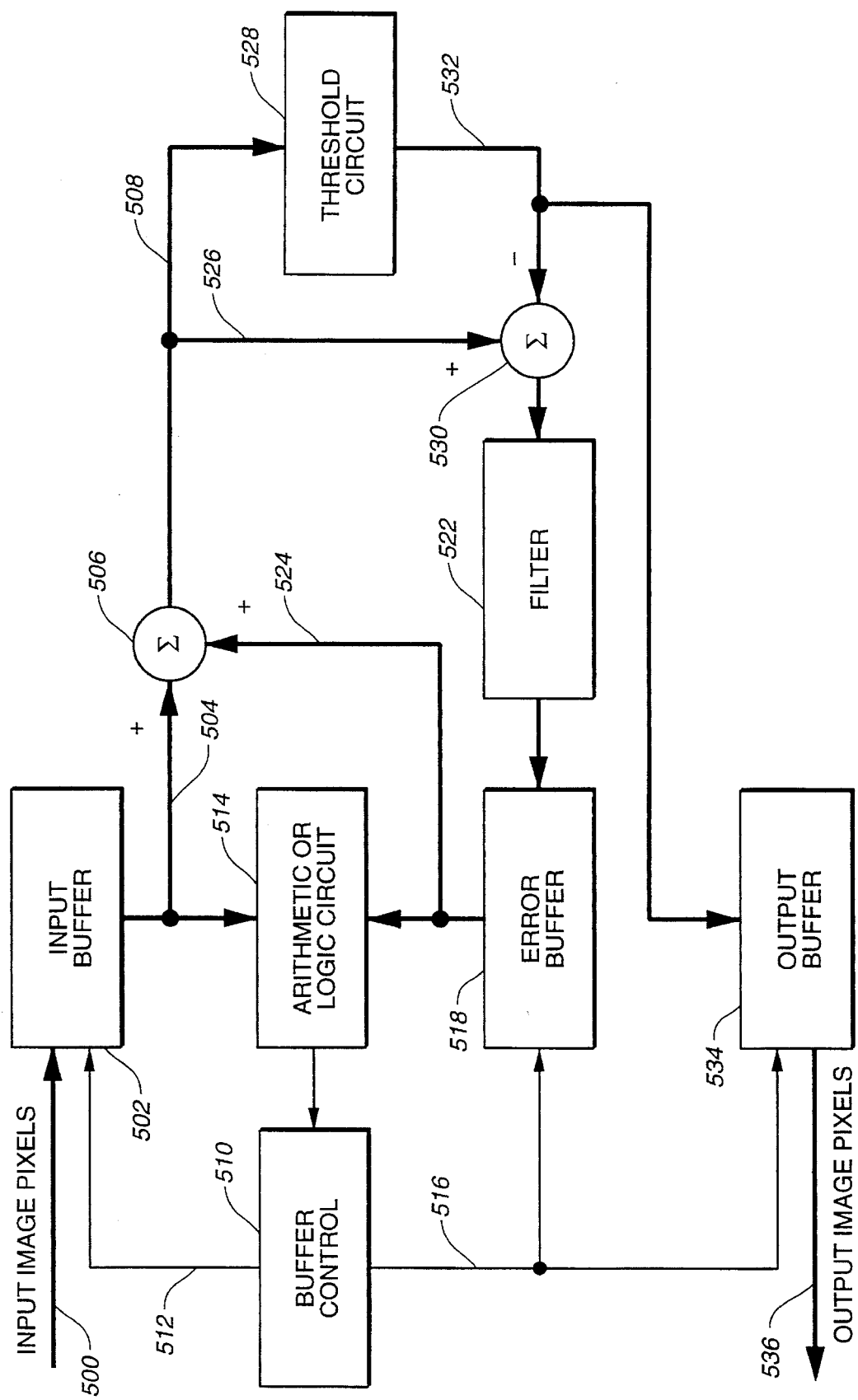
FIG._5

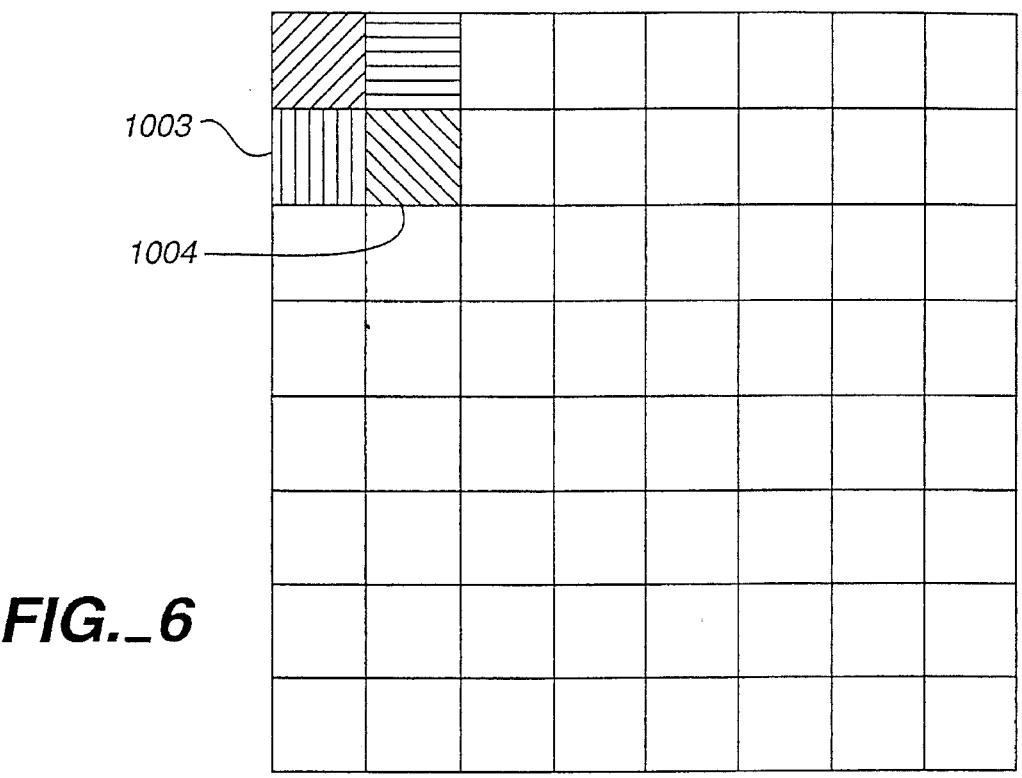
FIG._6
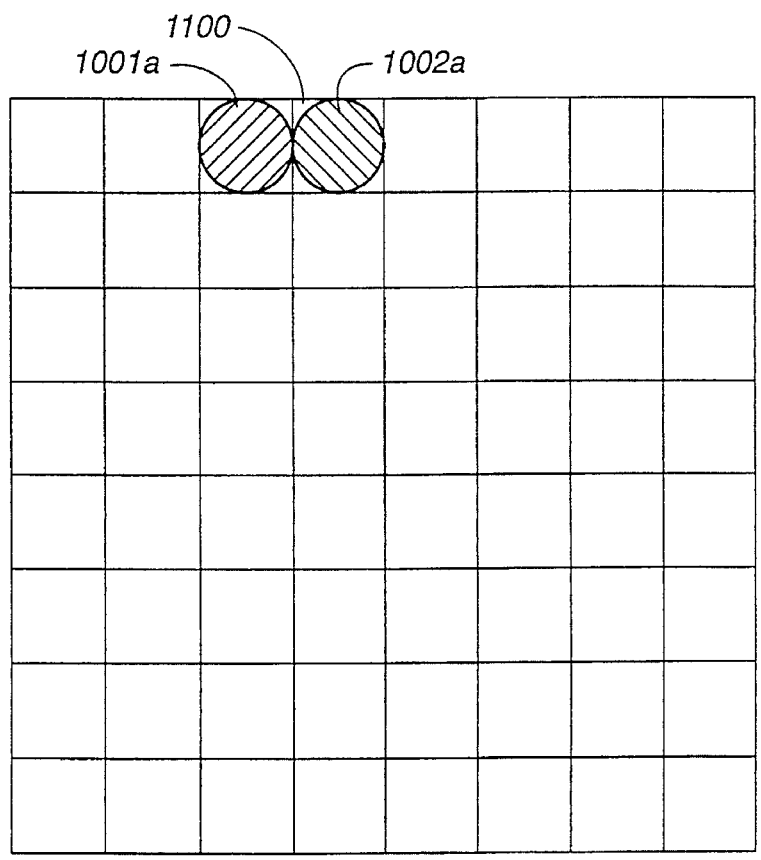
FIG._7

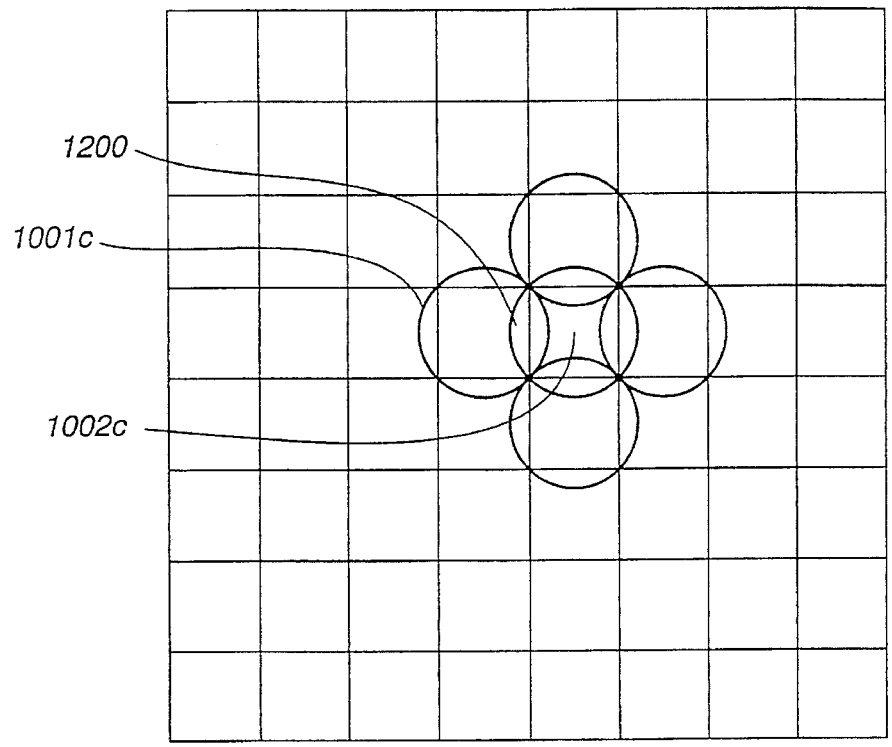
FIG._8
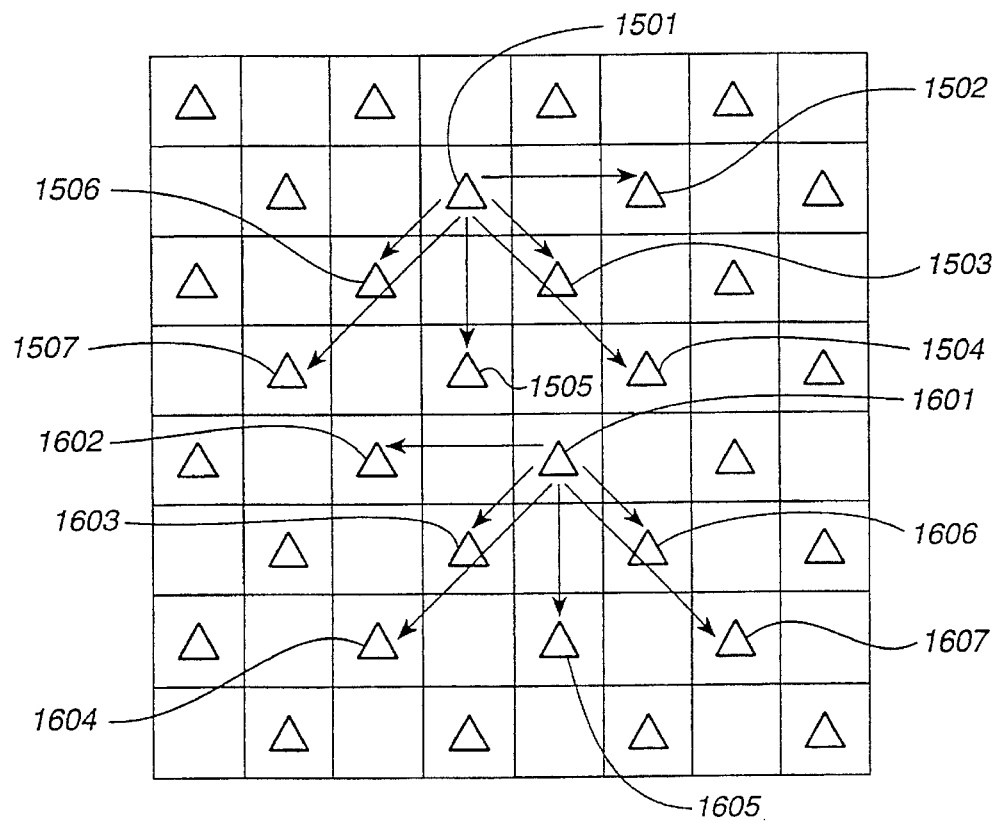
FIG._11

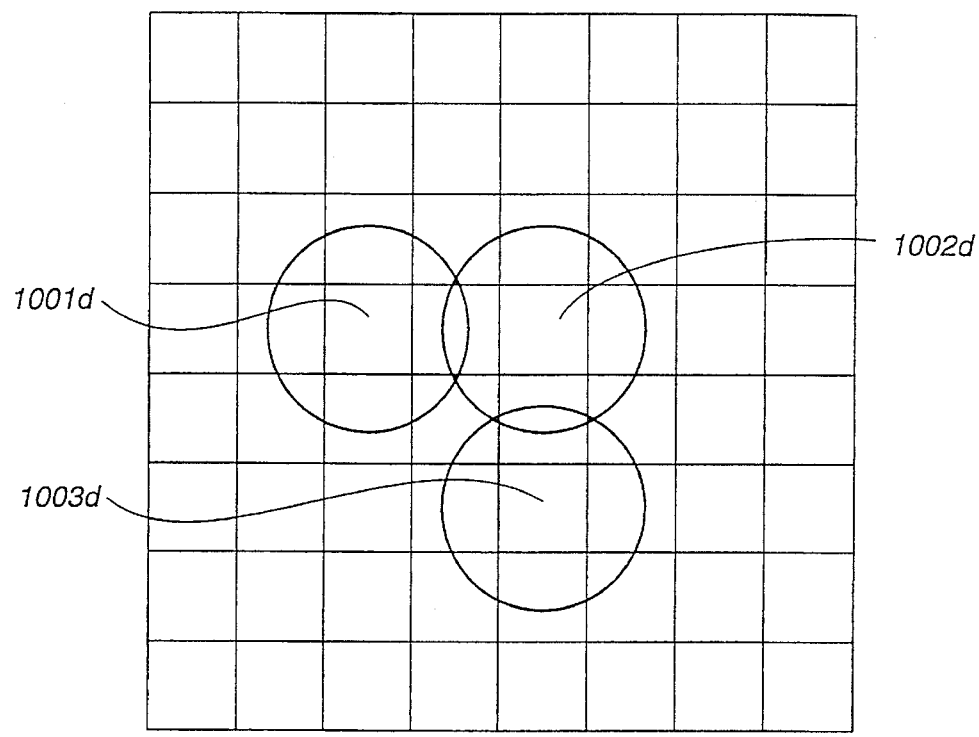
FIG._9A
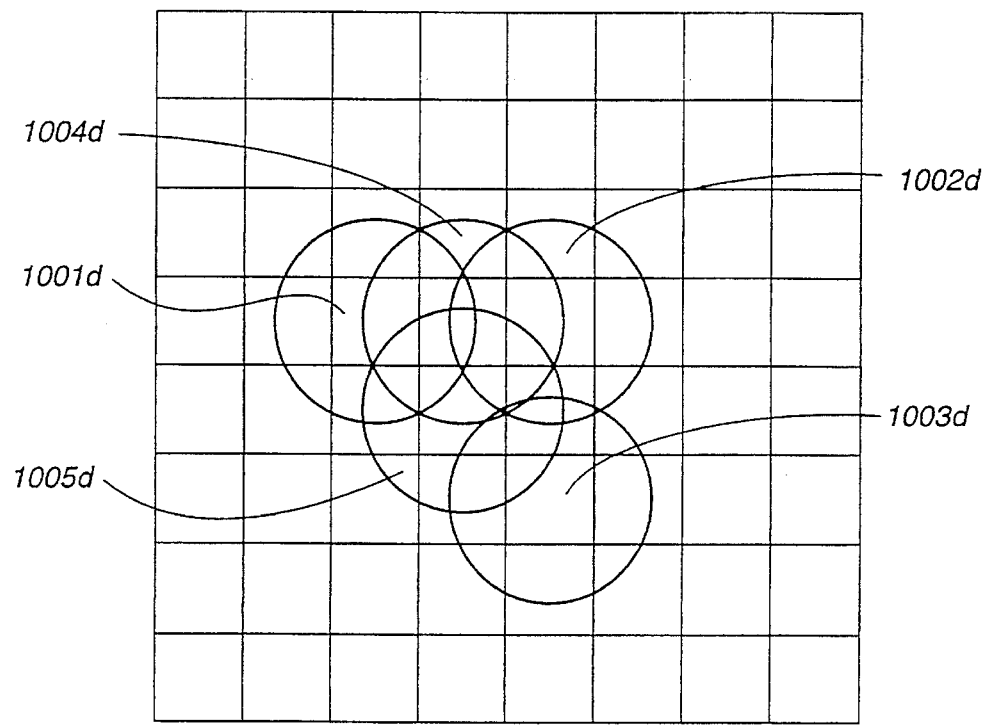
FIG._9B

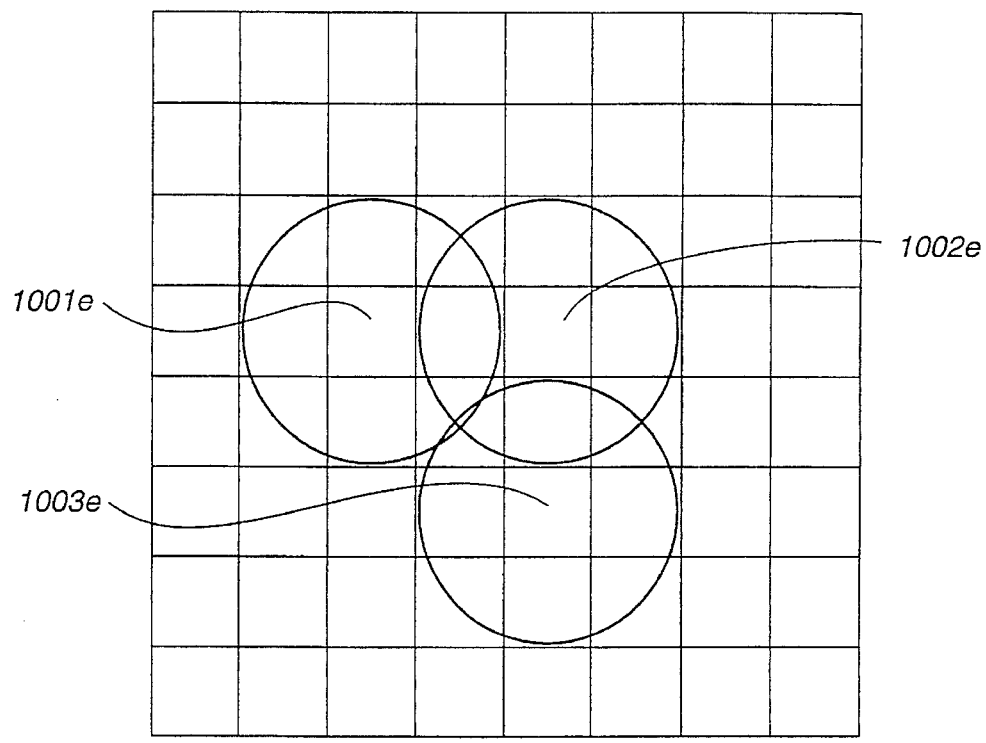
FIG._10A
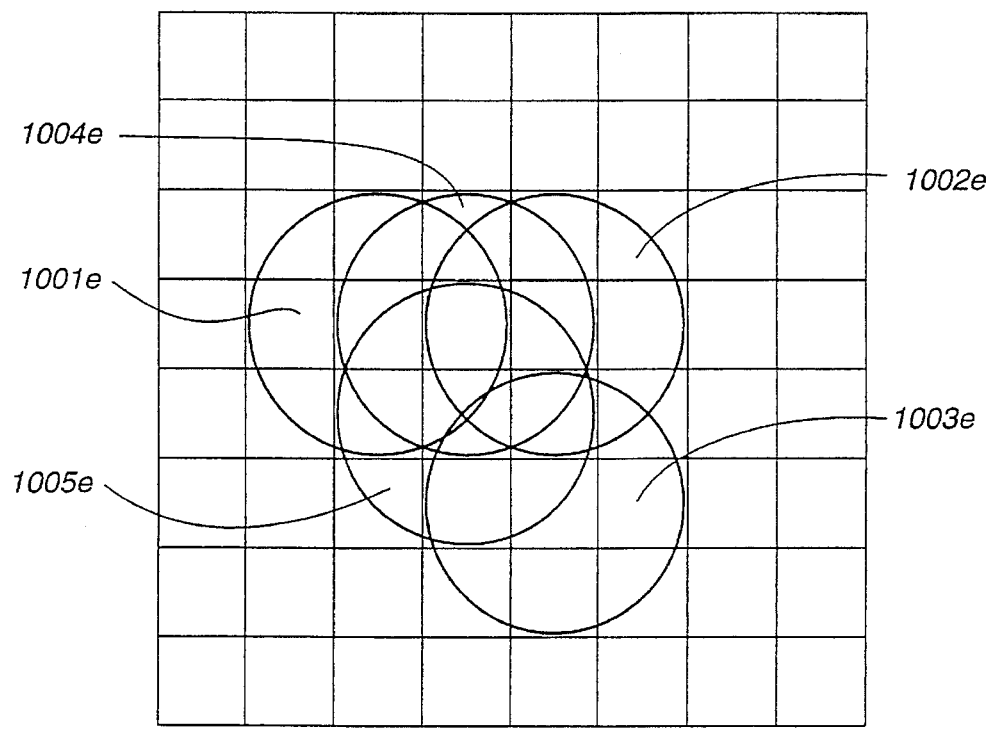
FIG._10B

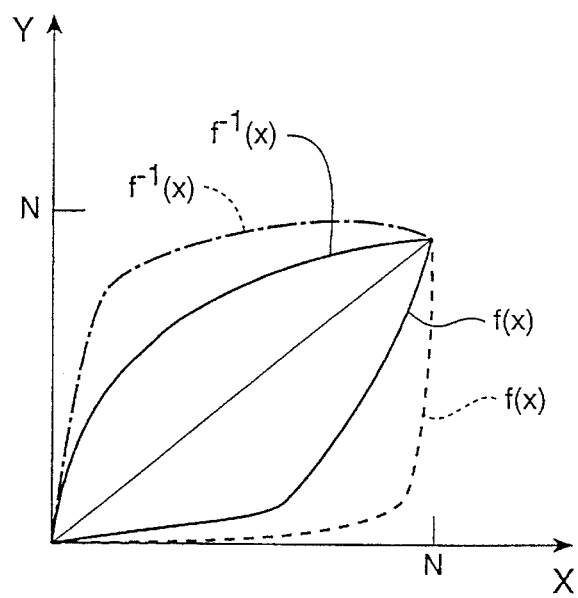
FIG._12
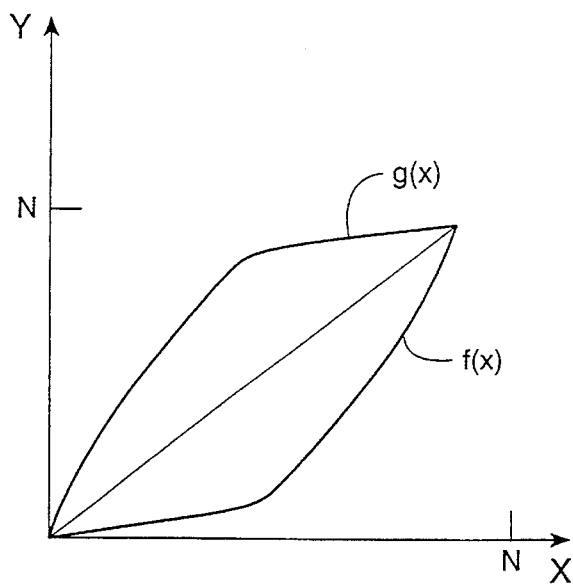
FIG._13A
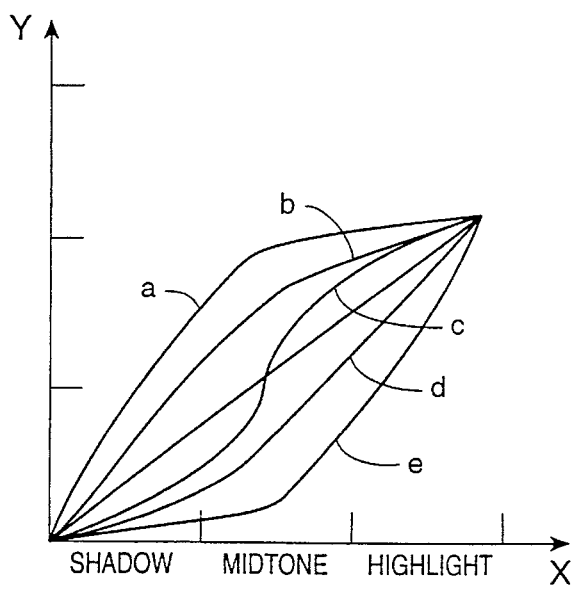
FIG._13B

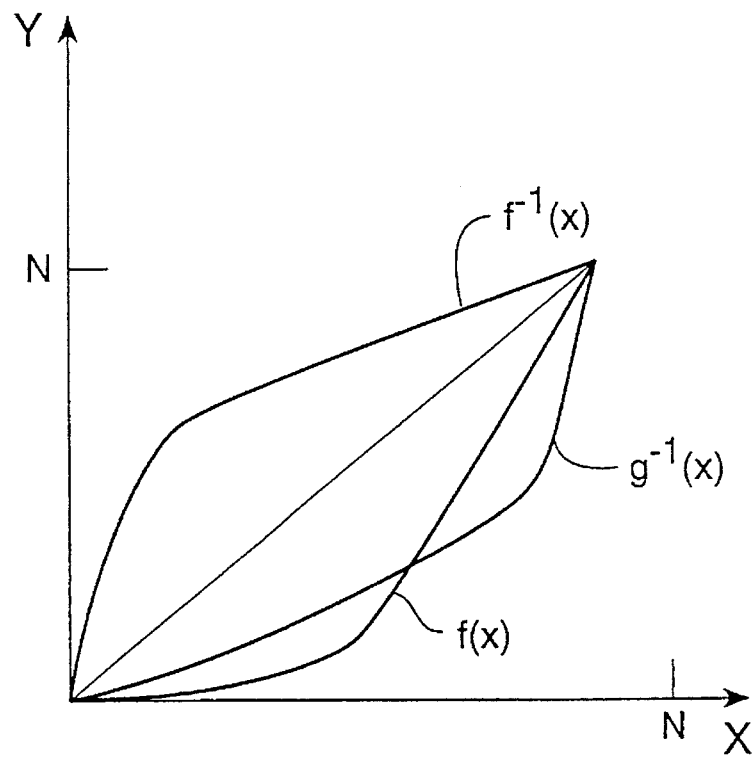
FIG._14A
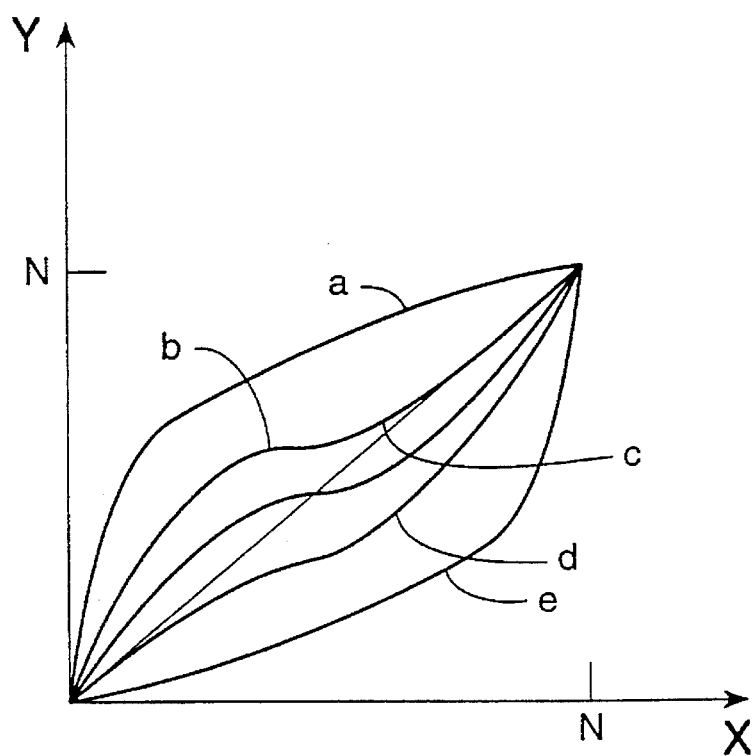
FIG._14B

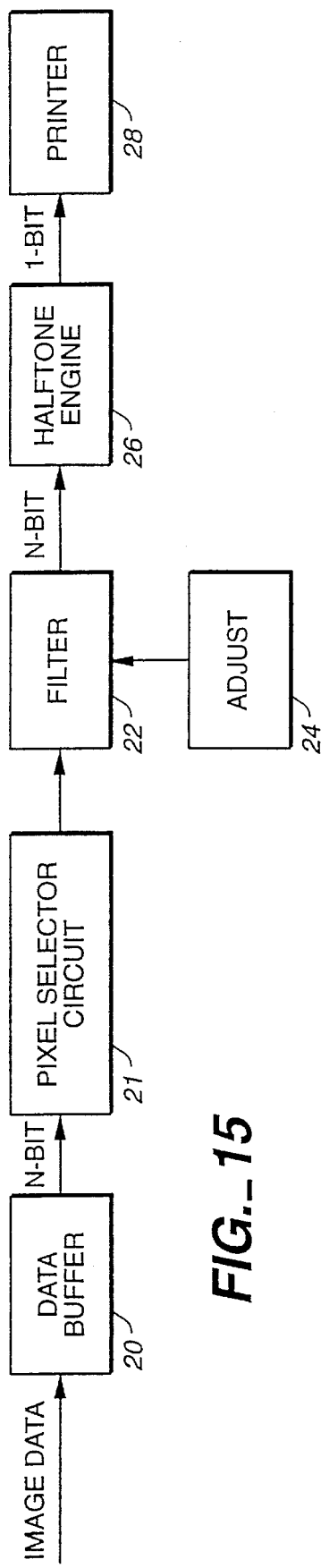
FIG._15
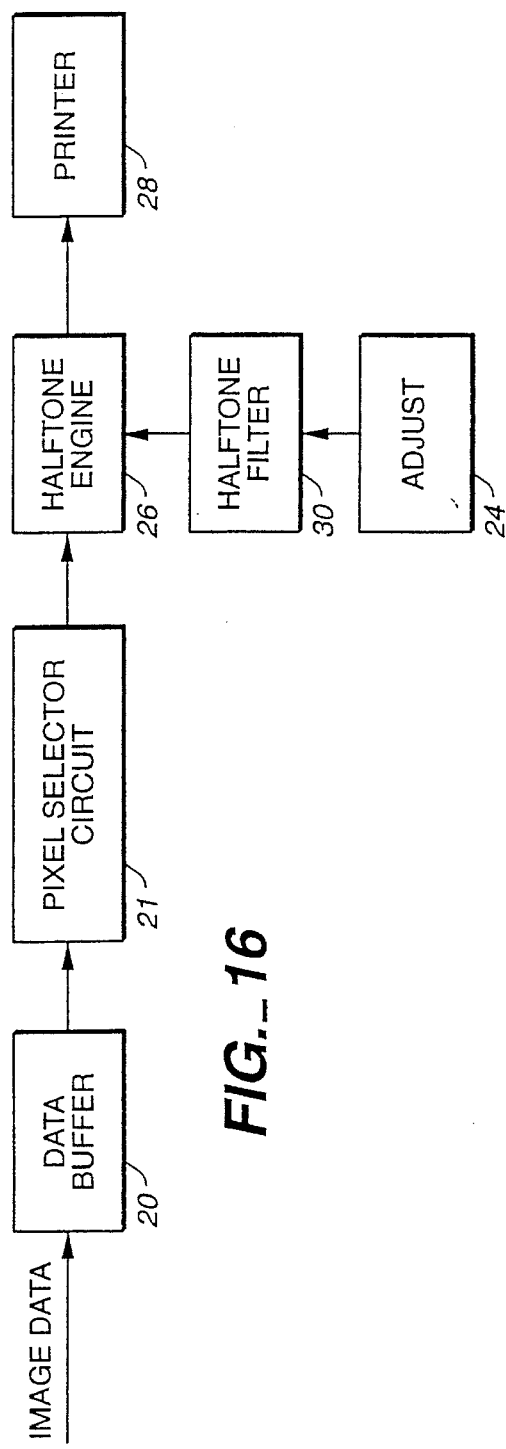
FIG._16

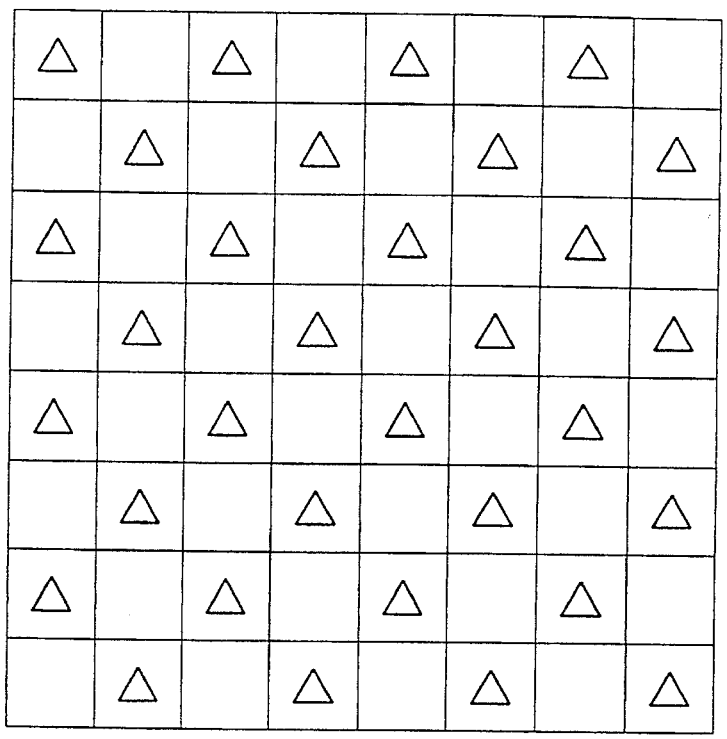
FIG._17
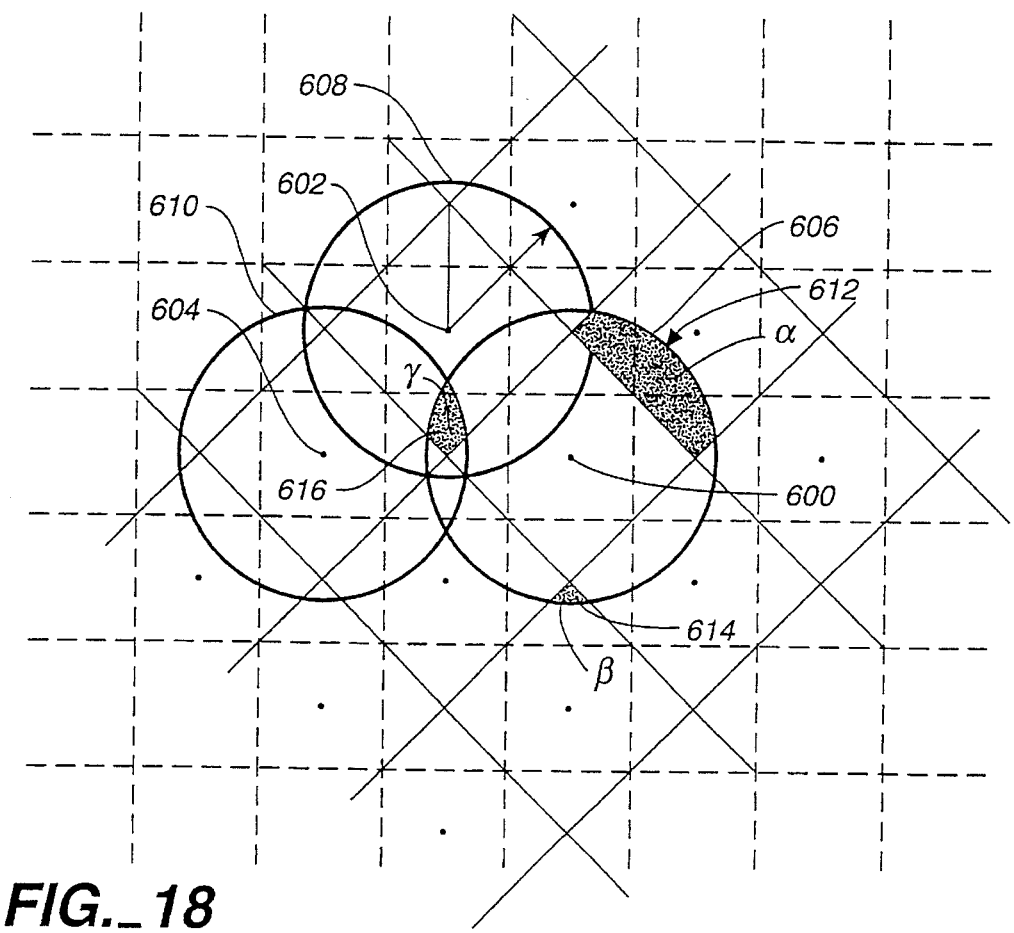
FIG._18

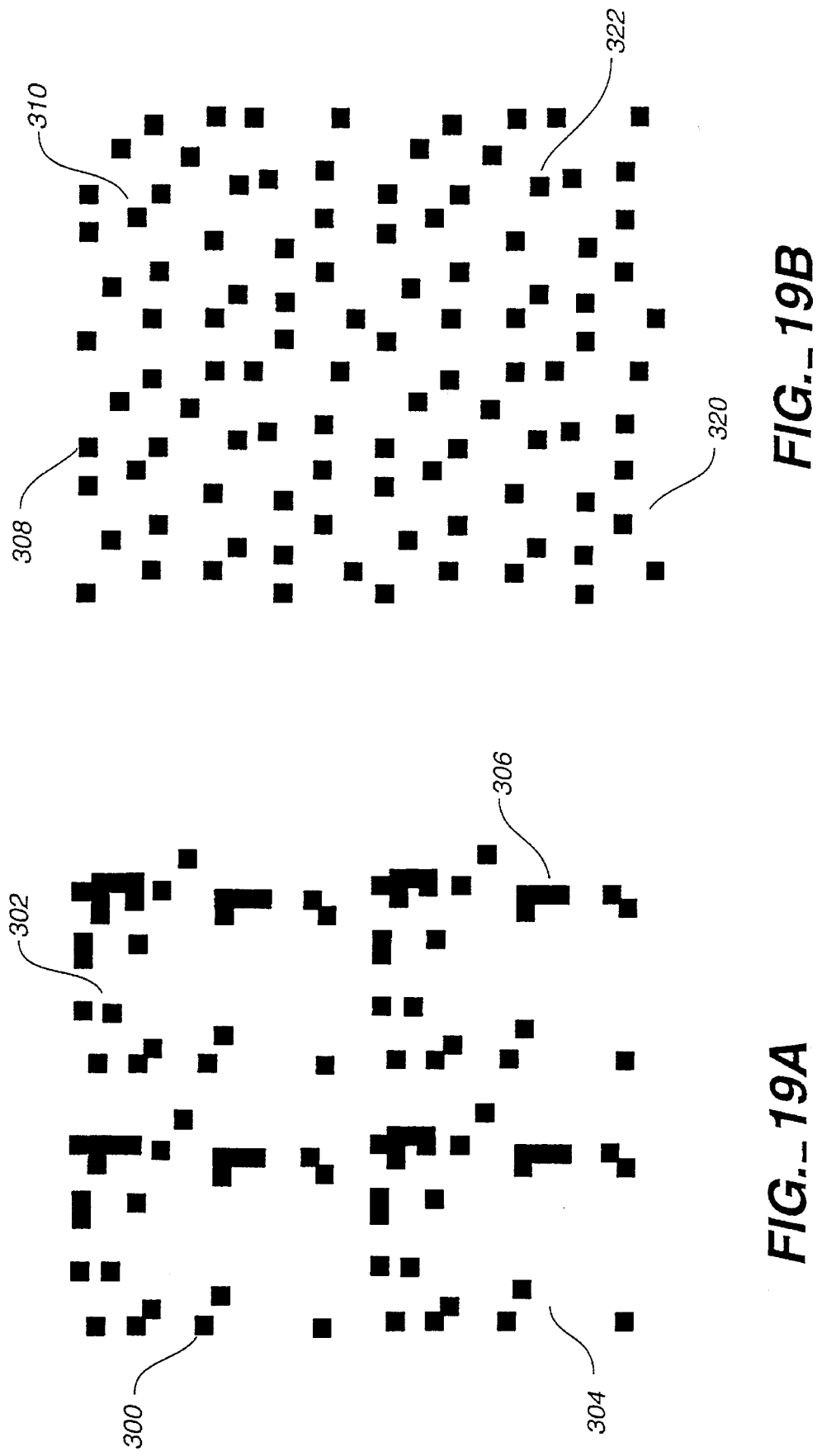

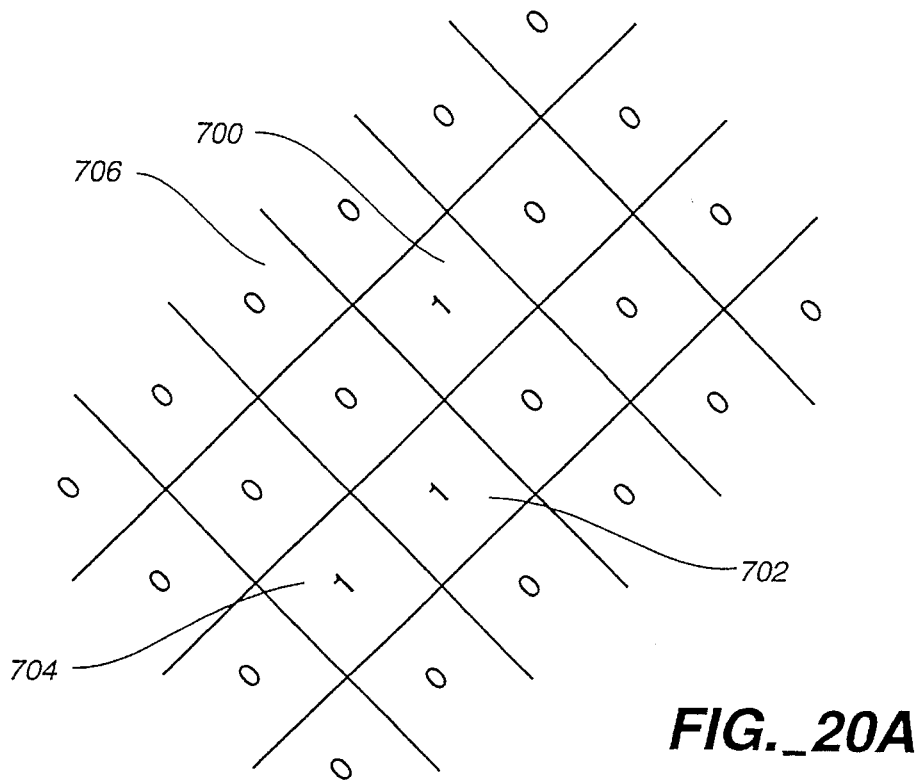
FIG._20A
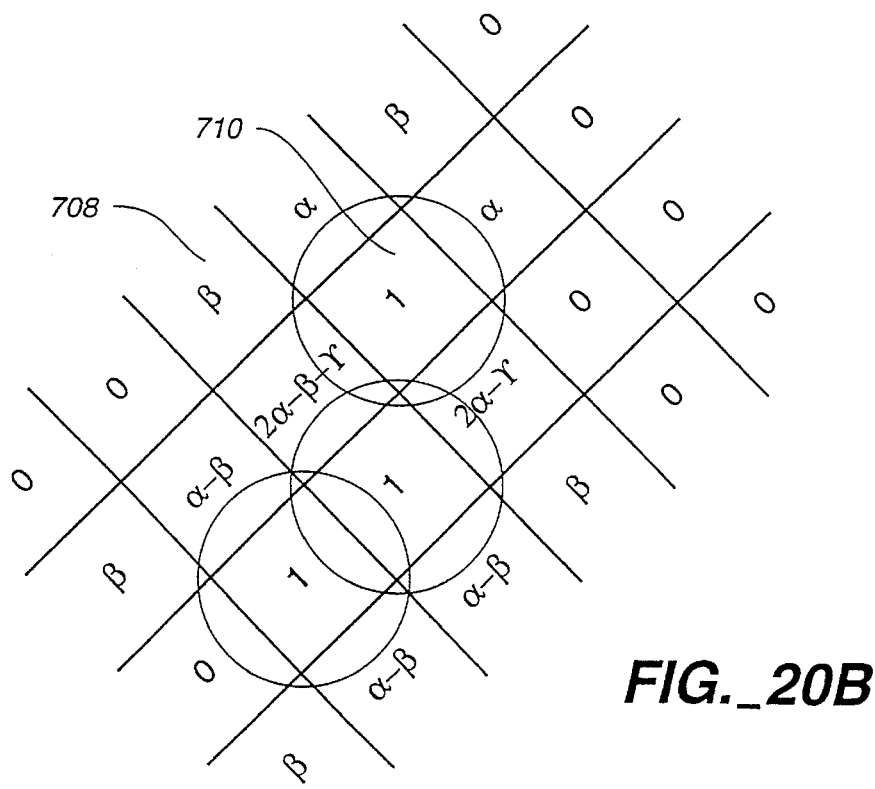
FIG._20B

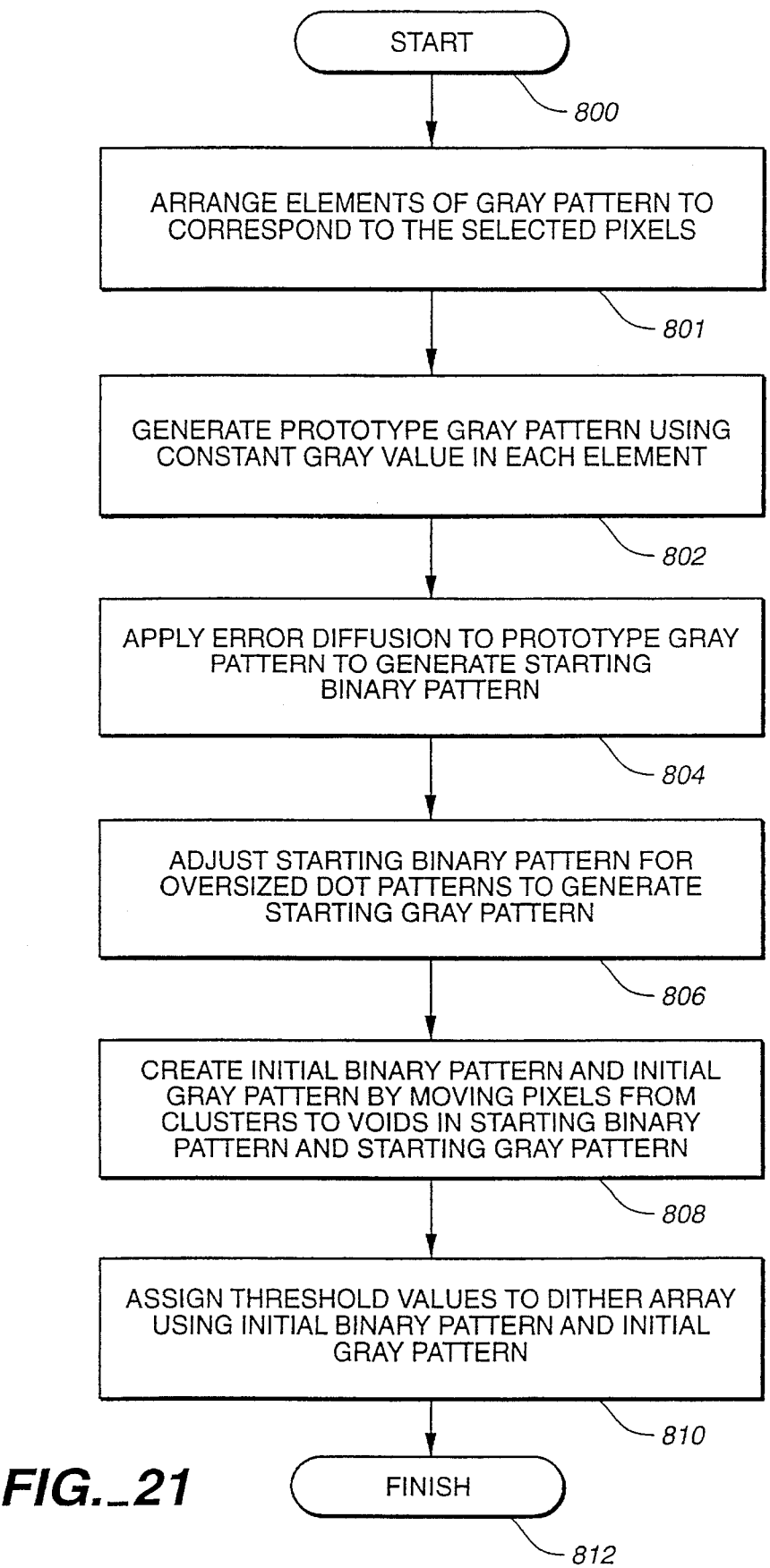
FIG._21

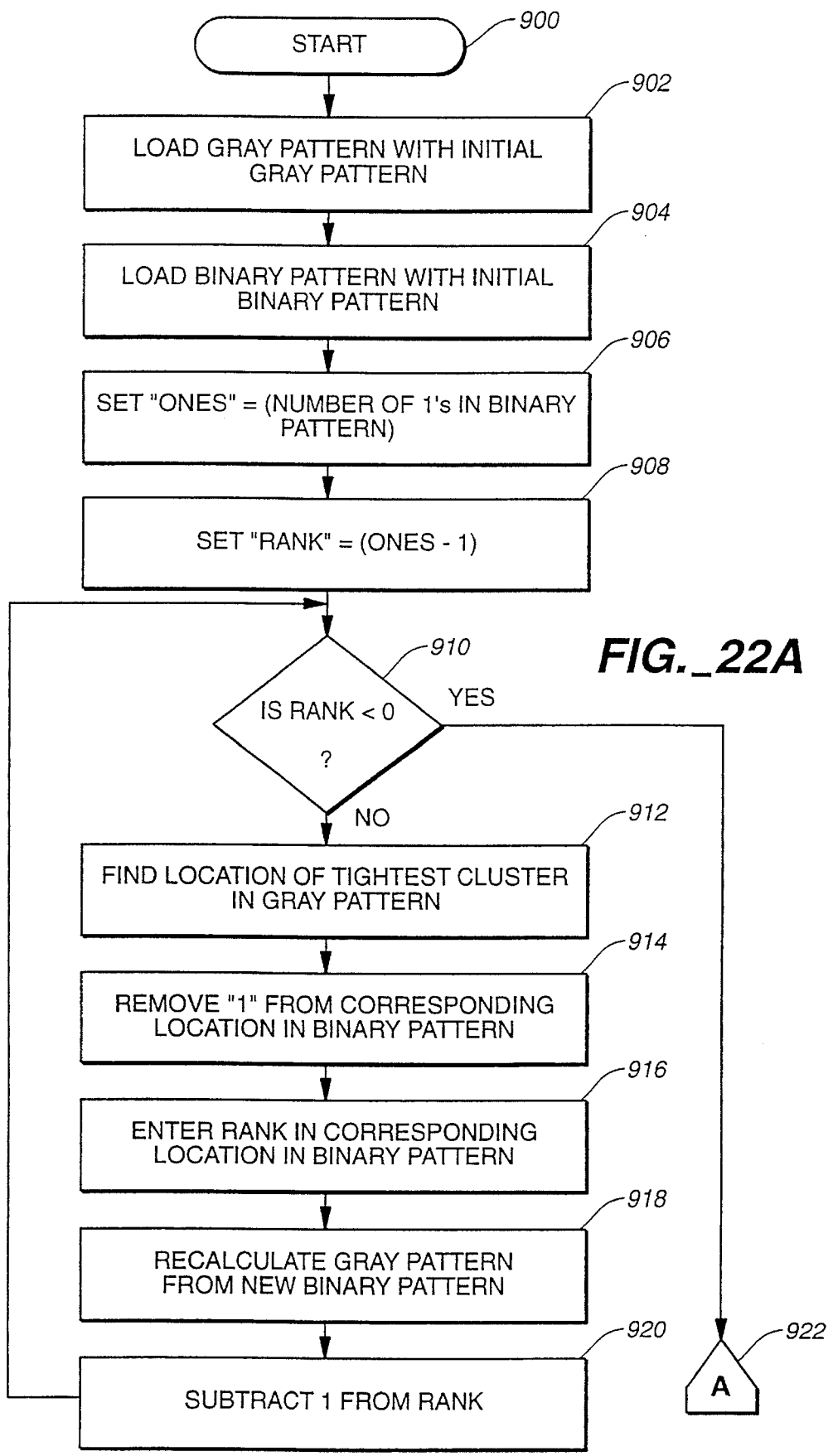
FIG._22A

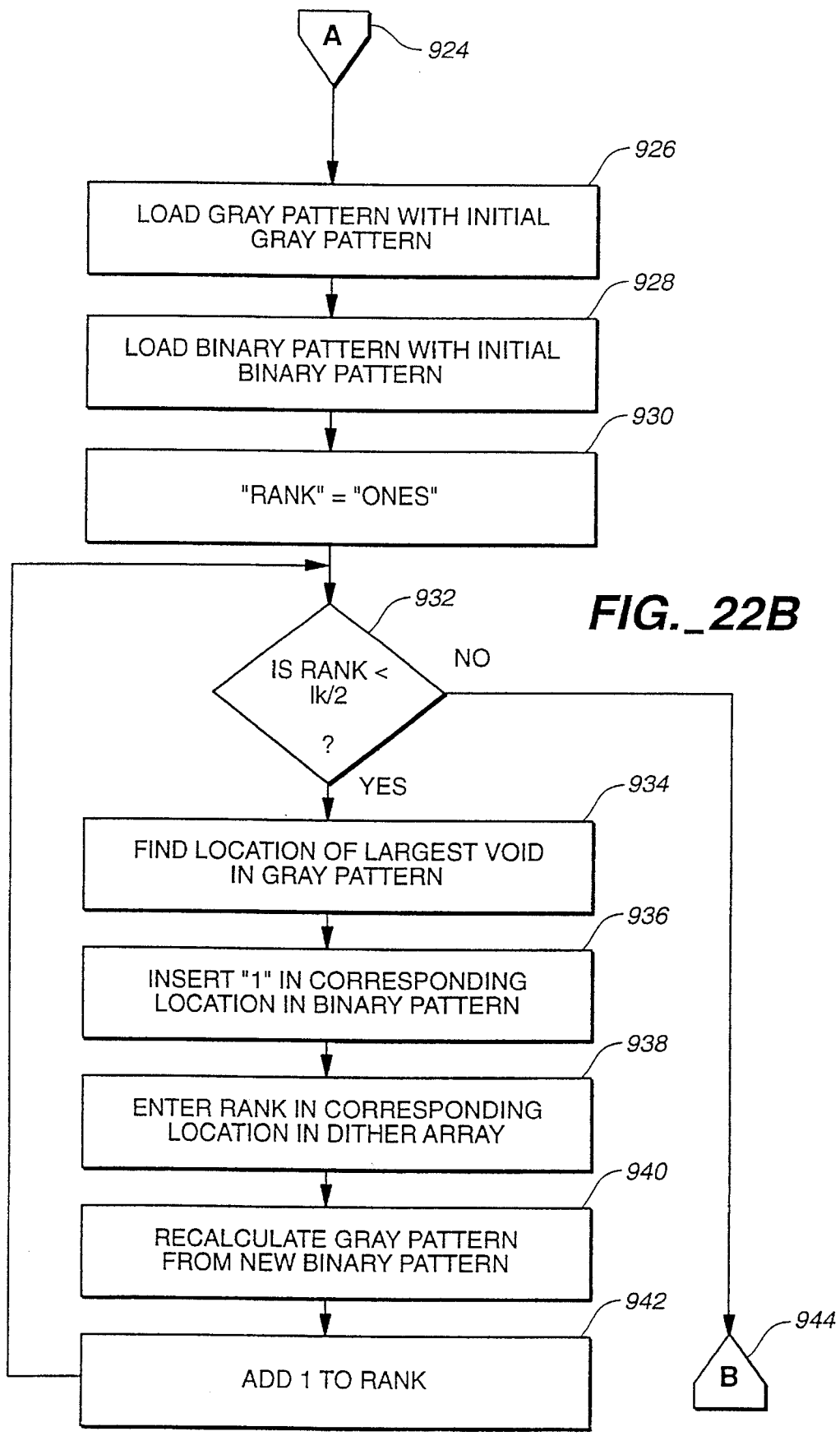
FIG._22B

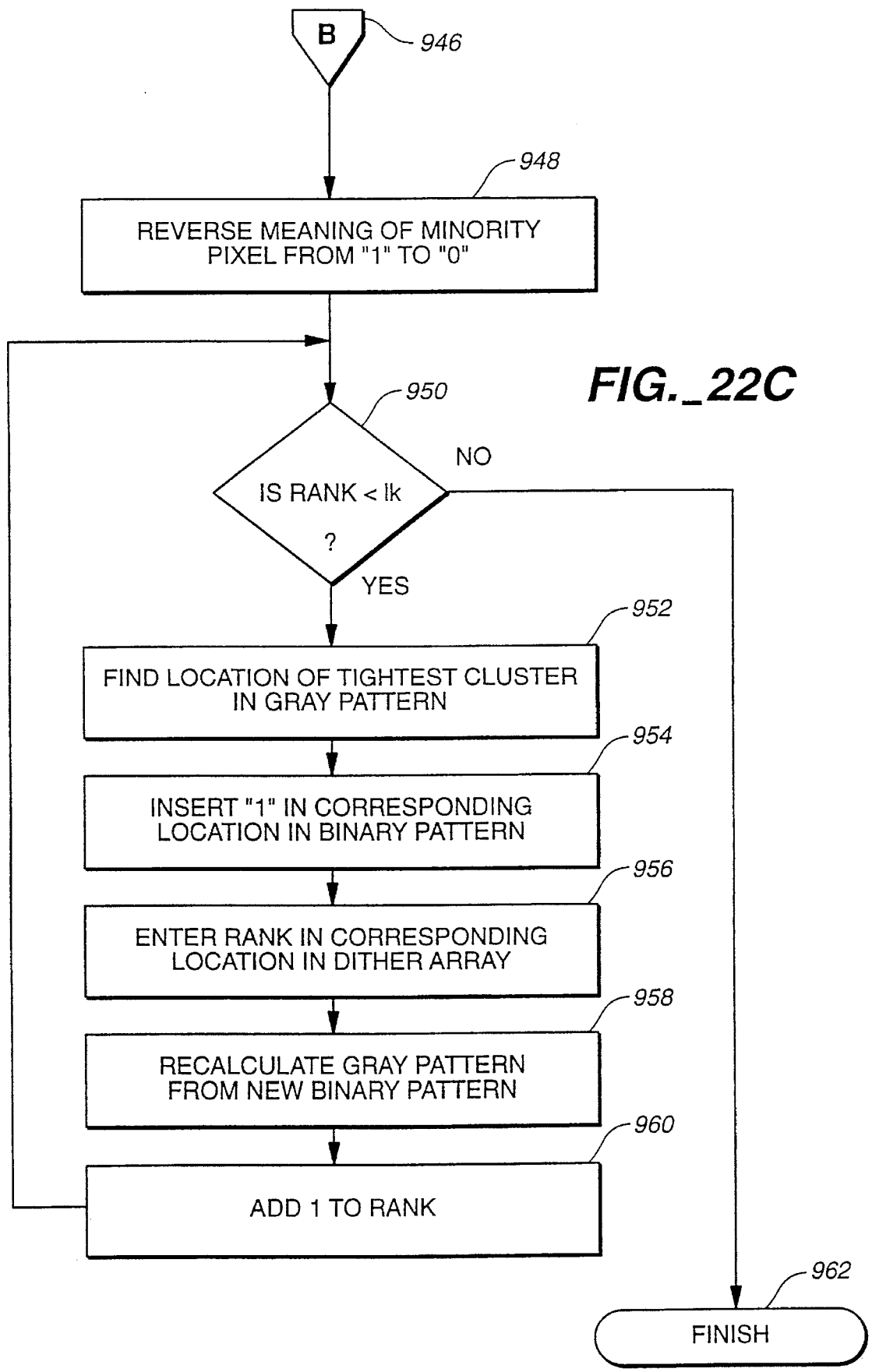
FIG._22C

METHOD AND APPARATUS FOR MINIMIZING ARTIFACTS IN IMAGES PRODUCED BY ERROR DIFFUSION HALFTONING UTILIZING INK REDUCTION PROCESSING

The is a continuation-in-part of the following application:

"METHOD AND APPARATUS FOR MINIMIZING ARTIFACTS IN IMAGES PRODUCED BY ERROR DIFFUSION HALFTONING", Ser. No. 08/269,708, filed on Jul. 1, 1994.

CROSS REFERENCE TO RELATED APPLICATIONS

This application is related to the following commonly-assigned, co-pending applications:

"IMPROVED METHOD AND APPARATUS FOR TONAL CORRECTION IN BINARY PRINTING DEVICES BY PREDISTORTION OF IMAGE DATA", Ser. No. 08/269,601, filed on Jul. 1, 1994, by Joseph S. Shu;

"IMPROVED METHOD AND APPARATUS FOR DITHER ARRAY GENERATION TO REDUCE ARTIFACTS IN HALFTONED IMAGES", Ser. No. 08/269,709, filed on Jul. 1, 1994, by Joseph S. Shu;

"METHOD AND APPARATUS FOR MINIMIZING ARTIFACTS IN IMAGES PRODUCED BY ERROR DIFFUSION HALFTONING", Ser. No. 08/269,708, filed on Jul. 1, 1994, by Joseph S. Shu;

"IMPROVED METHOD AND APPARATUS FOR VIVID COLOR CORRECTION IN BINARY PRINTING DEVICES" filed on an even date herewith by Joseph S. Shu;

"IMPROVED METHOD AND APPARATUS FOR REDUCING ARTIFACTS IN HALFTONED IMAGES USING GRAY BALANCE CORRECTION" filed on an even date herewith by Joseph S. Shu;

"APPARATUS AND METHOD FOR ENHANCING COLOR SATURATION-HALFTONED IMAGES" filed on an even date herewith by Joseph S. Shu;

"IMPROVED METHOD AND APPARATUS FOR TONAL CORRECTION IN BINARY PRINTING DEVICES BY PREDISTORTION OF IMAGE DATA UTILIZING INK REDUCTION PROCESSING" filed on an even date herewith by Joseph S. Shu; and "IMPROVED METHOD AND APPARATUS FOR DITHER ARRAY GENERATION TO REDUCE ARTIFACTS IN HALFTONED IMAGE DATA UTILIZING INK REDUCTION PROCESSING" filed on an even date herewith by Joseph S. Shu.

The disclosures of each of the above-mentioned patent applications are incorporated herein by reference.

BACKGROUND OF THE INVENTION

1. Field of the Invention

The present invention relates to digital printing devices, and in particular, to a technique for reducing the amount of ink and processing time required for printing.

2. Description of the Related Art

Most computer-driven printing devices which generate hard copy on an output media, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any case, the dot itself has a uniform color so that the resulting output consists of an array of colored and blank pixels.

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called "preprocessing". Numerous halftoning techniques have been developed and refined over the years. In their simplest form, such techniques compare the value of each digital word with a threshold level, and generate a binary output pixel value depending on the relative values.

For example, a digital scanner processing a continuous-tone image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with a either a single threshold value or an array of threshold values to produce the required binary output pixel stream. In such a system, each 8-bit scanner word has effectively been compressed into a single-bit output word.

Naturally, such compression produces a significant loss of visual information and, in turn, creates distortions in the reproduced image that are not present in the original image. Additional techniques have therefore been developed to reduce the visual distortions created by the halftoning process. One approach, known as "error diffusion", attempts to "diffuse" the "quantization error" (i.e., the difference between the input value represented by a multi-bit word and the output value represented by a single bit or two multi-bit words) proportionally among neighboring pixels.

This diffusion is performed by adding a portion of the quantization error to the input values of the next pixel in the processing line and to neighboring pixels in the following line or lines. The quantization error is added to the pixel values before processing so that the quantization error is "spread" over several pixels.

In accordance with one embodiment of the error diffusion process, the input pixels represented by the input words are processed in "raster" order (line-by-line with each line being processed from left to right before the next lower line is processed). In general with a left-to-right processing order, the error diffusion process produces an excellent image reproduction, but also creates well-known artifacts called "worms" and "snowplowing" which degrade image quality. The "worms" appear as curved or straight diagonal lines in areas of uniform gray and produce a patterned appearance in the halftoned image. Consequently, various techniques have been used to reduce or eliminate these kinds of artifact patterns.

Some of these known techniques, described, for example, in U.S. Pat. No. 4,955,065, Japanese HEI-Open Patent HEI 4-37256/92 and Japanese Laid-Open Patent HEI 4-51773/92, vary the processing sequence from the conventional raster scan pattern (where each the pixels in each line of the image are processed left-to-right and the lines are processed in a top-to-bottom order) to a serpentine scan pattern where the pixel lines are still processed from top-to-bottom, but alternate pixel lines are processed in opposite directions. This technique reorients the worms so that they appear as horizontal lines in uniform gray areas of the image and are thus less obtrusive; however they are still present to the same degree as when the conventional raster scan is used.

Another known method, described in Japanese Laid-Open Patent HEI 3-151762/91, of minimizing the appearance of worms also varies the processing sequence from the conventional raster pattern. In accordance with one embodiment, the processing direction for each image line is selected based on the output of a random number generator or noise pattern generator which is quantized to yield a stream of "1's" and "0's". Pixel processing for each line is therefore performed left-to-right (in response to a "1") or right-to-left (in response to a "0") in a random pattern. In accordance with another known embodiment, pixels in image lines are processed left-to-right and right-to-left in predetermined periodic patterns, e.g., two left-to-right scans, followed by two right-to-left scans, and so on. While these prior processing order techniques reduce the size of the worms, the worms are still visible in the halftoned image.

Another problem inherent in the error-diffusion method is the large number of computations necessary to process an image. Since several computations, including multiplications, must be performed on each processed pixel, millions of computations may be necessary to generate the final output values for a typical high-resolution image. In addition, it is necessary to store at least one line of error values that are to be applied to the succeeding line of image values. This large number of computations and the required storage combine to increase the processing time for each image, resulting in decreased printer throughput.

As a result, alternatives to error diffusion have been developed to reduce the number of computations necessary to process an image. One such alternative is called "ordered dithering," in which an array of predetermined (and generally different) threshold values—a "dither array"—with the same spacing as the image pixels is conceptually overlaid onto the image pixel array. If the dither array is smaller than the image array, then the dither array is repeated side-by-side or "tiled" over the image array to produce a repetitive pattern. Each pixel thus has two values conceptually associated with it, namely, the actual pixel tonal value and the threshold value of the overlaid dither array cell to which it is compared. Equivalently, the values in the dither array can be added to the tonal value of each pixel, and the augmented value compared with a fixed threshold. In either case, an output value is generated based on the comparison. Since the processing of each pixel involves only a simple comparison and is independent of neighboring pixel values, the computation time required to process an entire image is substantially less than that required for error diffusion.

However, the quality of the resulting processed image depends entirely on the threshold values chosen for the dither array. Two types of dither arrays are commonly used. In a "clustered-dot" dither array, the threshold values are organized into small groups having closely spaced values. These clusters mimic "dots" of various sizes, and thus produce processed images visually similar to those produced by the traditional halftone screen used for many years in photoengraving processes.

In "dispersed-dot" dithering, large and small threshold values are spread even throughout the array. This technique enhances the printable gray scale as well as resolution. For image-reproduction devices capable of clearly displaying a single isolated pixel, the dispersed-dot dither array usually produces better image quality than the clustered-dot dither array; this is because dispersed-dot arrays achieve better high-frequency fidelity and create a better illusion of a continuous gray region than do clustered-dot arrays of the same resolution and period.

With both types of arrays, a tradeoff generally exists between the number of discrete gray levels that can be represented (which increases as the number of dither-array elements or cells increases) and the appearance of annoying low-frequency geometric patterns in areas of uniform gray (which also appear as the number of dither-array elements increases). Increasing the size of the dither array also tends to decrease image resolution as low-frequency values disappear. One way to reduce these patterns while retaining resolution is to make the size of the dither array very large and utilize homogeneous patterns of threshold values, where successive threshold values "turn on" pixels in a homogeneous, random pattern. However, as the array size increase, assigning threshold values to the array cells to produce the necessary pattern becomes a non-trivial matter. Accordingly, various schemes have been developed to derive random value sequences and assign them to the array cells.

One common technique used to create a homogenous ordered dither array is called "recursive tessellation". The goal of recursive tessellation is to assign threshold values to each of the dither array cells in such a way that, as each successive cell is numbered or "turned on", the two-dimensional array of "on" cells is as homogeneously arranged as possible. Thus, when the dither array is used as a threshold array in a halftoning process, the corresponding arrangement of output binary dots will be disbursed as homogeneously as possible for each gray level to be simulated.

The algorithm used in recursive tessellation for generating the threshold array is based on the fact that if a regular geometric shape or "tile" is used cover or tessellate the two-dimensional dither array, the center point of the shape and its vertices can serve as center points for a retessellation of the array with new tiles of the same geometric shape but sized one cell smaller. In turn, the center points and vertices of these new tiles can act as center points for another retessellation with tiles that are again one cell smaller.

In accordance with the recursive tessellation algorithm, all of the tile vertices at each stage of this recursive tessellation are assigned threshold numbers before the next tessellation takes place. The algorithm provides a mechanism for locating a family of points that are exactly in the center of voids which occur between the vertex points of the tiles. Essentially, new points are added in the largest "voids" or areas where there is an absence of "on" pixels. The recursive tessellation method and the resulting threshold arrays are described in detail in "Digital Halftoning" by Robert Ulichney, printed by the MIT Press, Cambridge, Massachusetts and London, England, 1990, pages 128–171. While the recursive tessellation method can produce large dither arrays, these arrays suffer from a strong periodic structure that imparts an unnatural appearance to the resulting images when the arrays are used in a conventional halftoning operation.

Consequently, other conventional methods have been developed to generate dither arrays and one of these conventional methods is called a "blue noise mask". In general, "blue noise" is the high-frequency portion of a white noise spectrum. The power spectrum of blue noise has a low-frequency cutoff and is flat out to some fine high frequency limit. In general, the dot patterns produced by a blue noise mask are aperiodic and radially symmetric and these patterns produce an aperiodic, uncorrelated dither array structure without low frequency graininess. The choice of a blue noise mask arose from studies of the frequencies present in dot patterns produced by the error diffusion process described previously. When these dot patterns are converted into to a power spectrum of power versus frequency, it can be seen that the power spectrum has a low frequency cutoff point which occurs in the blue light frequency range, hence the name "blue noise"

The shape of the power spectrum can be used to construct dither arrays by examining dot patterns which produce blue noise power spectra and creating dither arrays from these dot patterns. The resulting arrays produce a high-quality output, however, the conversions between the frequency and spatial domains necessary to derive the arrays produces a complicated algorithm for generating the dither arrays. Blue noise masks are described in more detail in "Digital Halftoning Using A Blue Noise Mask", T. Mitsa and K. Parker, Proceedings SPIE, Image Processing Algorithms And Techniques II, v.1452, pps. 47–56, February 21 st–March 1, 1991.

Another conventional technique for generating a large, homogeneous dither array is called the "void-and-cluster method". Again, the goal of this latter method is to produce a homogeneous distribution of 1's and 0's by starting with an initial pattern and removing pixels from the center of the tightest "clusters" and inserting them into the largest "voids". The void-and-cluster method is described in detail in "The Void-and-Cluster Method For Dither Array Generation", Robert Ulichney, IS&T/SPIE Symposium on Electronic Imaging Science and Technology, San Jose, Calif., Feb. 3, 1993 and "Filter Design For Void-and-Cluster Dither Arrays", Robert Ulichney, Society for Information Display International Symposium, San Jose, Calif., Jun. 14–16, 1994, the contents of which are hereby incorporated by reference.

In particular, in accordance with the aforementioned articles, the initial pattern used to generate the dither arrays is called a "Prototype Binary Pattern" and the terms "cluster" and "void" are defined in terms of "minority pixels" and "majority pixels". When less than half of the pixels in the Prototype Binary Pattern are of a particular type (either "1's" or "0's") they are denoted as minority pixels and the other type of pixel is denoted as a majority pixel. Using these definitions of minority and majority pixel, the terms "cluster" and "void" refer to the arrangement of minority pixels on a background of majority pixels. In particular, a "void" is a large space between minority pixels and a "cluster" is a tight grouping of minority pixels. During the processing of the Prototype Binary Pattern, minority pixels are always added to the center of the largest voids and are removed (or replaced with a majority pixel) from the center of the tightest cluster in order to homogenize the pattern.

The void-and-cluster method consists of three distinct steps:

(A) generating the Prototype Binary Pattern;

(B) "homogenizing" the Prototype Binary Pattern by removing pixels from the clusters and assigning them to the voids to generate a homogenized Initial Binary Pattern; and (C) assigning dither array threshold numbers to the resulting homogenized Initial Binary Pattern.

More specifically, the Prototype Binary Pattern is generated by using any convenient technique that generates an input pattern where not more than half the pixels are "1's" and the rest are "0's". For example, a white noise pattern will serve as the Prototype Binary Pattern.

The next step in the method is to find the "voids" and the "clusters" so that pixels can be moved between the voids and clusters. Voids and clusters are located by means of a filter which examines the neighboring pixels bordering each pixel being processed. In particular, a void-finding filter considers the neighborhood pixels around every majority pixel in the Prototype Binary Pattern and a cluster-finding filter considers the neighborhood pixels around every minority pixel. In the aforementioned articles, a two-dimensional Gaussian filter represented by the function:

$$e^{-\frac{x^2}{2\sigma_x^2} - \frac{y^2}{2\sigma_y^2}}$$

is used in order to find voids and clusters. During this processing, the values in the array are repeatedly processed and a single pixel may be moved several times from cluster to void. This processing is performed iteratively until the voids stop getting smaller and the clusters stop getting looser. Processing is deemed complete when removing the "1" from the tightest cluster in the pattern creates the largest void. The resulting homogenized pattern is called the Initial Binary Pattern.

In accordance with the third step of the method, the dither array is built from the Initial Binary Pattern by assigning threshold values to the dither array using the Initial Binary Pattern. In performing this step, the Initial Binary Pattern and the dither array are manipulated in parallel in three phases in accordance with a predetermined algorithm. Threshold values are assigned to the dither array cells based on the "rank" value of the "1's" in the Initial Binary Pattern. In particular in Phase I, one minority pixel or "1" is removed at a time from the Initial Binary Pattern while, in parallel, the rank or the number of minority pixels remaining in the Initial Binary Pattern is entered into the dither array in the location corresponding to the location of the removed "1". In each case, the minority pixel that is removed is the pixel in the center of the tightest cluster.

In the second phase (Phase II) the Initial Binary Pattern is again used as the starting basis and one minority pixel (or "1") is inserted at a time into the Initial Binary Pattern while, in parallel, its rank is entered into the dither array. In each case, the minority pixel that is inserted is done so at the location of a "0" identified as the center of the largest void.

Finally, in Phase III the Initial Binary Pattern produced by adding "1's" in Phase II is used as the starting point. In Phase III, the meaning of "minority pixel" is reversed from "1" to "0" because there are more 1's than 0's in the Initial Binary Pattern due to "1's" being added in Phase II. The Initial Binary Pattern is now filled with more and more 1's while the dither array continues to be filled with the rank values. In each step a "1" is inserted in the "0" location identified in the tightest cluster of minority pixels. At the end of Phase III, the Initial Binary Pattern is filled with all 1's and the dither array is filled with a unique rank value in each element from 0 to the maximum of pixels.

While the void and cluster method produces a dither array that, in turn, generates high-quality halftoned images that are generally artifact-free there is still some tonal distortion and the resulting image can be further improved. All digital halftoning techniques assume perfectly square pixels, which fully cover the printable area of the recording medium. If this were truly the case, the printer output density would be directly proportional to the input (scanned) density of the original; the ideal case, as indicated by the 45° line in FIG. 12, occurs when output density precisely matches input density. In fact, however, the response of real electronic printing devices is typically nonlinear because such devices do not generate perfectly adjacent, nonoverlapping square dots; instead, they tend to produce dots that are more round than square, and which extend beyond the square boundaries of ideal pixels. This is necessary to ensure that adjacent dots fully overlap without leaving uncolored space (so that, for example, fully colored fields are printed solidly, without uncolored gaps) under a variety of printing conditions. Because the dots are larger than what is assumed in the halftoning algorithm, a plot of printer output density (expressed in terms of normalized percentage dot area) as a function of input gray-scale density—with larger values along the axes corresponding to lower density values, so that the maximum density occurs at the origin—ordinarily follows a curve similar to f(x) (solid line) in FIG. 12; the printed image, accordingly, appears darker than it should. The precise form of f(x) is determined both by characteristics of the printer and the selected halftoning algorithm.

To compensate for this effect, the function f(x) is defined mathematically through piecewise density measurements and regression, and an inverse (transfer) function, $f^{-1}(x)$, (dotted line) defined as well. The latter function, when applied to incoming source data, offsets the effects of the printer function, correcting the data so that processing by the halftoning algorithm will produce a printed output whose density characteristics more closely match that of the original.

Although this technique, known as "predistortion," produces printed output superior to unmodified halftoned image data, correction to the ideal linear response does not necessarily produce the most visually desirable printed copy. This is due to the complex interactions between the human visual system and the patterns produced by halftoning algorithms on a variety of scales. Subjective responses frequently vary with both the halftoning algorithm employed and the degree of predistortion. See, e.g., Trontelj et al., "Optimal Halftoning Algorithm Depends on Printing Resolution," SID 92 Digest at 749 (1992). The present invention is directed toward improving predistortion to enhance the visual appearance of printed output.

Commonly-assigned co-pending application Ser. No. 08/269,601, filed on Jul. 1, 1994 is directed to a printing apparatus and method in which multibit source data representing the density variations of an original or source image is modified by a filter function. The filtered data is then processed by a halftoning module that converts the data into a raster of single-bit data suitable for transfer to a printing device. Instead of conforming linearly to the input source data, the raster data specifies a density pattern lighter than that of the source image in highlight and upper midtone regions, and darker than that of the source image in shadow and lower midtone regions.

Moreover, the filter is applied to parameters associated with the halftone processing algorithm rather than to the source data. For example, in a dithering scheme that utilizes an array of threshold values, the filter function can be applied to these values such that, when the filtered values are applied in an inverse fashion to source data to produce the raster pattern, that pattern is weighted according to the desired nonlinear output function. This approach can generate considerable savings in processing load, since a single dither array is modified just once but is applied repeatedly to the source data. Using, for example, a 64×64 dither array, application of the filter function to each cell requires processing of 4,096 data values; by contrast, assuming a sampling density of 720×720 dots per inch for the source image, applying the filter function to each source-data value would require processing of over 40 million data points for each 8"×10" document.

Typically, many digital halftoning techniques assume ideally shaped pixels such as square pixels, which fully cover the printable area of the recording medium. This is necessary to ensure that adjacent dots fully overlap without leaving uncolored space (so that, for example, fully colored fields are printed solidly, without uncolored gaps) under a variety of printing conditions. FIG. 6 illustrates a hardcopy output of a printer having a resolution of 1/dpi, where dpi is dots per inch. As shown therein, ideal pixels 1001–1004 are illustrated as "ON". It is noted, that there are no voids between adjacent pixels.

These ideally shaped pixels are in effect an approximation. Actual pixels are represented by dots generally more circular in shape. As is known by one of ordinary skill in the art, the size or radius of these dots is dependent on many factors including, for example, the printing mechanism, the ink and the recording sheet.

FIG. 7 is an example where the diameter of a dot printed for the pixel is equal to or less than 1/dpi. In other words the radius r is less than $1/(\sqrt{2} \, dpi)$. As shown therein, a void 1100 is present between dots representing pixels 1001a and 1002a. Accordingly, when two adjacent pixels are ON there will be portions having voids. This example produces unacceptable results and thus dots having a radius $\leq 1/(\sqrt{2} \, dpi)$ are avoided.

FIG. 8 is another example in which the radius of a dot representing a pixel is:

$$1/\sqrt{2} \; dpi \leq r < 1/dpi$$

As shown therein, there are no voids between dots of adjacent pixels, for example pixels 1001c and 1002c. However, the dots representing pixels 1001c and 1002c overlap in area 1200.

FIGS. 9-A and 9-B, illustrate another example of a dot representing a pixel having a radius of:

$$/dpi \leq r \leq \sqrt{2} \; /dpi$$

FIG. 9-A shows for simplicity every other pixel on every other row. As shown therein every other pixel in the same row, for example, pixels 1001d and 1002d (or column, for example, pixels 1002d and 1003d) overlap. However the dots representing pixels 1001c and 1003c do not overlap. FIG. 9-B illustrates every other pixels. As shown therein, the dot representing pixel 1004d provides redundant information since the dots representing pixels 1001d and 1002d occupy the area of pixel 1004d. As such, ink used to print pixel 1004d is unnecessary. Moreover, additional computations and printing time are required to print with every adjacent pixel. Typical values at 720 dpi of 1/dpi is 0.0014 inches, r is 0.0015 inches and √2/dpi is 0.0020 inches.

Moreover for dots having this size, a plot of printer output density (expressed in terms of normalized percentage dot area) as a function of input gray-scale density—with larger values along the axes corresponding to lower density values, so that the maximum density occurs at the origin—ordinarily follows a curve similar to f(x) (dashed line) in FIG. 12; the printed image, accordingly, appears darker than it should. Additionally, as illustrated by its more rectangular in shape, the picture would have less dynamic range. Typically the dynamic range would be about half. As such the inverse (transfer) function, $f^{-1}$ (x), (dashed-dotted line) also has about half the dynamic range.

FIGS. 10-A and 10-B illustrate the example in which a dot representing a pixel has a radius of:

$$\sqrt{2} \; /dpi < r$$

This example is similar to the example in FIGS. 9-A and 9-B, except the dots representing pixels 1001e and 1003e (referred to as alternate diagonal pixels) also intersect.

Conventional printers generally have a resolution of 300 to 360 dpi, Printers with higher resolutions may have a resolution of 720 dpi. As will appreciated, printing at 720 dpi has approximately 4 times the resolution as 360 dpi. In other words at 720 dpi a one inch square printing area contains 720×720 or 518,400 dots. On the other hand, a resolution of 360 dpi has 360×360 or 129,600 dots. However with current technology, using conventional printing mechanisms, ink and/or paper to print at 720 dpi the dot size obtainable is:

$$/dpi \leq r \leq \sqrt{2} \; /dpi$$

as shown in FIGS. 9-A and 9-B. As such, printing at 720 dpi with this dot size results in printing redundant information and requires additional computation and printing time.

OBJECTS OF THE INVENTION

Accordingly, it is an object of the present invention to provide apparatus and a method of improving the resolution of the halftone images produced by a binary printing device Another object of the invention is to provide a method and apparatus which overcomes the problems of conventional printers.

A further object of the present invention is to provide a method and apparatus which prints at a high resolution while requiring less ink than compared to conventional devices and methods.

An additional object of the present invention is invention is to provide a method and apparatus which prints at a high resolution while requiring less computations than compared to conventional devices and methods.

A still yet another object of the present invention is to provide a method and apparatus which applies non-linear predistortion processing without the loss of dynamic range.

Still another object of the invention is to provide such a method which can be implemented relatively easily either in specialized hardware or in existing printer drivers.

A further object of the present invention is to reduce the tonal distortion produced by halftoning using a dither array generated by the void-and-cluster method.

An additional object of the present invention is to generate an ordered dispersed-dot dither array of arbitrary size wherein the dots are distributed homogeneously.

It is a further object of the present invention to reduce the tonal distortion produced by halftoning using a dither array generated by the void-and-cluster method.

It is still yet a further object of the present invention to generate an ordered dispersed-dot dither array processing time.

Other objects will, in part, be obvious and will, in part, appear hereinafter.

DESCRIPTION OF THE INVENTION

Summary of the Invention

According to an aspect of the present invention, a method and an apparatus is provided for converting a continuous-tone image, represented as an array of electronically encoded n×m pixels comprising n rows of m pixels each specifying a gray-scale value, into a binary raster suitable for electronic printing. As such, a series of pixels are identified corresponding to a linear segment of the image. The identified pixels comprise, for example, odd ones of the m pixels on corresponding odd ones of the n rows of pixels and even ones of the m pixels on corresponding even rows of the n rows of pixels. The identified pixels are processed, in the sequence corresponding to a movement along the segment in the predetermined direction to convert the pixels into binary raster values. The identifying and processing of the pixels are repeated until the image has been fully processed.

According to another aspect of the present invention, an image processing means for converting a continuous-tone image into a binary array suitable for printing comprises a memory means for storing an array of electronically encoded n x m pixels each representing a gray-scale value. A reading means reads every other pixel from the memory means. A halftoning means is provided for iteratively processing series of pixels read by the reading means each corresponding to a linear segment of the image, in a sequence representative of a movement along the segment in a predetermined direction, so as produced binary rest of values therefrom.

According to a further aspect of the present invention, a printer for printing a continuous-tone image as patterns of monochromatic dots on a print medium comprises a digitizing means responsive to the continuous-tone image for generating a stream of electronically m×n encoded pixel values, each represents a gray scale of a portion of the continuous-tone image. A memory means responsive to the stream of electronically encoded pixel values is provided for storing the electronically encoded pixel values in a plurality of linear segments, each linear segment having a start and an end and comprising pixel values that represent contiguous portions of the continuous-tone image. A reading means reads every other electronically encoded pixel from the memory means. A halftoning means processes each pixel value corresponding to the electronically encoded pixels read by the reading means in each of the plurality of linear segments in a start to end sequence and in an end to start sequence to generate output results. A print mechanism responsive to the output results generates the patterns of monochrome dots on the print medium.

According to an additional aspect of the present invention a computer system comprises a memory for storing data and programs. A central processing unit responsive to the program stored in the memory is provided for controlling and coordinating the operation of the computer system, and a digitizing means responsive to a continuous-tone image generates a stream of electronically encoded pixels each representing gray scale value of a portion of a the continuous-tone image. A memory means responsive to the stream of electronically encoded pixels stores the electronically encoded pixel values in a plurality of linear segments, each linear segment having a start and an end and comprising pixel values that represent contiguous portions of the continuous-tone image. A reading means reads every other pixel from the memory means. A halftoning means processes each pixel value corresponding to the electronically encoded pixel read by the reading means in each of the plurality of line segments in a start to end sequence and an end to start sequence to generate output results. A printer responsive to the output results prints patterns of monochrome dots on a print medium to generate a half-tone image.

According to still another aspect of the present invention, an apparatus and a method for printing is provided in which the series of pixel data corresponding to a linear segment of source image is obtained. Every other one of the pixel data obtained is selected. The selected pixel data is filtered in accordance with the filter function. The filtered pixel data is processed into a halftone pattern which, when printed exhibits a density pattern lighter than the source image and highlight in upper midtone regions and darker than that of the source image in shadow in lower midtone regions. The half-tone pattern is printed onto a recording medium.

According to still a further aspect of the present invention a printer comprises a source of serially encoded pixel data representative of density levels associated with the source image. A selector selects every other one of the pixel data. A half-tone engine processes the selected pixel data into a raster pattern represented of the density pattern corresponding to the source image but lighter than that of the source image in highlight regions and darker than that of the source region in mid-tone and shadow regions. A means is provided for applying ink or toner to a recording medium in accordance with the half-tone pattern.

The inventive method can be incorporated easily into the driver software of a printing device at relatively little cost or embodied in specialized hardware in the printer port or the printer itself. When the inventive method is utilized high-quality halftone images can be produced by means of error diffusion halftoning with minimized worm-type artifacts.

These and other objects, features and advantages of the present invention will become more apparent upon consideration of the following detailed description of the preferred embodiments of the present invention taken in conjunction with the accompanying drawings. Although the detailed description and annexed drawings describe the preferred embodiments of the present invention, it should be appreciated by those skilled in the art that many variations and modification of the present invention fall within the spirit and scope of the present invention as defined by the appended claims.

BRIEF DESCRIPTION OF THE DRAWING

In the drawings, wherein like numerals represent like parts:

FIG. 1 is a block schematic diagram of a computer system, for example, a personal computer system on which a halftoning operation using an error diffusion technique as modified by the inventive method can operate;

FIG. 2 is a schematic block diagram of a prior art computer system showing the relationship of an application program, an operating system and a printer driver in which the halftoning or preprocessing operation is performed;

FIG. 3 illustrates a processing sequence for processing pixels in the Prototype Binary Pattern using the error diffusion technique;

FIG. 4A illustrates an illustrative selection of proportional coefficients used in the error diffusion processing when pixels are processed in the left-to-right direction;

FIG. 4B illustrates an illustrative selection of proportional coefficients used in the error diffusion processing when pixels are processed in the right-to-left direction;

FIG. 5 is a block schematic diagram of an error diffusion halftoning apparatus showing the generation of the processing direction from the line and error buffer contents;

FIG. 6 is a diagram illustrating a group of adjacent ideal pixels;

FIG. 7 is a diagram illustrating pixels having a radius of $r \leq 1/(\sqrt{2} \text{ dpi})$;

FIG. 8 is a diagram illustrating pixels having a radius of $/dpi\sqrt{2} \leq r(1/dpi$;

FIG. 9-A is a diagram illustrating every other pixel on every other line having a radius of $/dpi \leq r \leq \sqrt{2}/dpi$;

FIG. 9-B is a diagram illustrating adjacent pixels having a radius of $/dpi \leq r \leq \sqrt{2}/dpi$;

FIG. 10-A is a diagram illustrating every other pixel on every other line having a radius of $\sqrt{2}dpi<r$;

FIG. 10-B is a diagram illustrating adjacent pixels having a radius of $\sqrt{2}/dpi<r$;

FIG. 11 is a diagram illustrating an error diffusion technique applied to every other pixel;

FIG. 12 graphically illustrates how the output of electronic printers tends to deviate, in terms of density level, from a source continuous-tone image, and how this deviation is corrected in the prior art;

FIGS. 13-A and 13-B graphically illustrate derivation of a parameterized family of transfer functions in accordance with the present invention, and the resulting printer outputs;

FIGS. 14-A and 14-B graphically illustrate derivation of a parameterized family of transfer functions adapted for use with a dither array;

FIG. 15 illustrates, in block-diagram form, a preferred hardware implementation of a second aspect of the present invention;

FIG. 16 illustrates, in block-diagram form, a preferred hardware implementation of a third aspect of the present invention;

FIG. 17 is a schematic diagram depicting every other pixel to be processed in accordance with an aspect of the present invention;

FIG. 18 illustrates the three adjustment areas ($\alpha$, $\beta$ and $\gamma$) used to correct the Initial Binary Pattern to account for oversized dots;

FIG. 19A is an illustrative Prototype Binary Pattern generated using white noise;

FIG. 19B is an improved Prototype Binary Pattern generated by applying a cluster-and-void technique to the pattern in FIG. 19A.

FIG. 20A is a portion of the Initial Binary Pattern created with the prior art void-and-cluster method illustrating the values assigned to each array cell;

FIG. 20B is the same portion of the Initial Binary Pattern created with the inventive improved void-and-cluster method illustrating the adjusted values assigned to each array cell;

FIG. 21 is an illustrative flowchart of the steps involved in the improved void-and-cluster method; and FIGS. 22A-C, when placed together, form an illustrative flowchart of the steps involved in adding threshold values to the dither array in accordance with the principles of the invention.

DETAILED DESCRIPTION OF THE PREFERRED EMBODIMENTS

The invention is preferably practiced in the context of an operating system resident on a personal computer such as the IBM PS/2 or Apple Macintosh computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains a "imaging engine" which is a hardware device or a ROM-programmed computer which takes the incoming information stream and converts it into the electrical signals necessary to drive the actual printing elements. The result is a "hard copy" output on the selected medium. The present invention and the apparatus which performs the error diffusion process may also be incorporated into specialized hardware located in the printer port 212 of the printer 218 itself.

As noted above, a printer printing at a resolution of 720 dpi and having dots with a radius of $/dpi \leq r \leq \sqrt{2}/dpi$ tends to print redundant information. Turning again to FIG. 9-B, the dots representing pixels $1001d$ and $1002d$ overlap in a region of pixel $1004d$. Thus is it not necessary perform any processing and printing at pixel $1004d$. Thus in accordance with the present invention only alternate pixels will be processed and printed on each line. For example, as shown in FIG. 17 on the odd numbered lines on the odd column pixels and on the even numbered lines only the even column pixels are processed and printed. (Alternatively, as will be appreciated by one of ordinary skill in the art, on the odd numbered lines the even column pixels and on the even numbered line the odd column pixels are processed and printed.) By printing in this manner, a resolution of 360×720 or 259, 200 pixels for a square inch can be obtained, which is twice the resolution than at 360 dpi. As noted above, these pixels are halftoned processed for printing on a binary printer. Such processing includes, for example, error diffusion and dithering, the details of which is described hereinbelow.

ERROR DIFFUSION

The error diffusion process itself is well-known and is, for example, described in detail in "Digital Halftoning" by Robert Ulichney, printed by the MIT Press, Cambridge, Massachusetts and London, England, 1990, at pps. 239–319. During the error diffusion process, the pixels which comprise the original image are processed on a line-by-line fashion and, in each line, the pixels are processed in single direction (from left-to-right or right-to-left). A common line processing pattern is shown in FIG. 3 where each of the pixel lines 300, 302, 304, 306 and 308 is processed from left-to-right, then the next line is processed from left-to-right, and the following line is processed from left to right, etc. until the entire image is processed in the top to bottom direction.

FIG. 4A illustrates diffusion of the error generated during the processing of each pixel to neighboring pixels in the case where processing proceeds along the line in the left-to-right direction. In particular, each pixel is processed by comparing its value to a predetermined threshold value where the pixel "value" is the original grayscale value plus error adjustments resulting from the previous processing of other pixels. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

This "diffusion" process is illustrated in FIG. 4A where the pixel being processed is depicted as box 400. In the illustrated arrangement, the error resulting from the processing is spread to the neighboring pixel to the immediate right of the processed pixel 400 (as indicated by arrow 402) and to three neighboring pixels on the next line of binary pattern pixels as indicated by arrows 404, 406 and 408. Before being added to the neighboring pixels, the error value is multiplied by a proportionality constant. The values of these constants, $q1$ $q2$ $q3$ and $q4$ are arranged such that $q1+q2+q3+q4=1$. For example, the following weights can be used: $q1=5/16$, $q2=1/16$, $q3=7/16$ and $q4=3/16$. After pixel 400 has been processed, the neighboring pixel to the right of pixel 400 is processed by adding the proportionalized error value to the pixel value and processing it in the same manner as pixel 400. After each pixel in a line has been processed in this manner, the next line in the image is processed in the same manner.

The diffusion process in the case where the pixel processing takes place in the right-to-left direction is illustrated in FIG. 4B where the pixel being processed is depicted as box 410. In the illustrated arrangement, the error resulting from the processing is spread to the neighboring pixel to the immediate left of the processed pixel 410 (as indicated by arrow 412) and to three neighboring pixels on the next line of binary pattern pixels as indicated by arrows 414, 416 and 418. Before being added to the neighboring pixels, the error value is also multiplied by a proportionality constant. The values of these constants, $q1$ $q2$ $q3$ and $q4$ are arranged such that $q1+q2+q3+q4=1$. For example, the following weights can be used: $q1=5/16$, $q2=1/16$, $q3=7/16$ and $q4=3/16$. After pixel 410 has been processed, the neighboring pixel to the left of pixel 410 is processed by adding the proportionalized error value to the pixel value and processing it in the same manner as pixel 410. After each pixel in a line has been processed in this manner, the next line in the image is processed in the same manner.

In general with a left-to-right processing order, the error diffusion process produces an excellent image reproduction, but also creates well-known artifacts called "worms" and "snowplowing" which degrade image quality. The "worms" appear as curved or straight diagonal lines in areas of uniform gray and produce a patterned appearance in the halftoned image. Consequently, various techniques have been used to reduce or eliminate these kinds of artifact patterns.

Some of these known techniques, described in U.S. Pat. No. 4,955,065, Japanese Laid-Open Patent HEI 4-37256/92 and Japanese Laid-Open Patent HEI 4-51773/92 vary the processing sequence from the conventional raster scan pattern (where each the pixels in each line of the image are processed left-to-right and the lines are processed in a top-to-bottom order) to a serpentine scan pattern where the pixel lines are still processed from top-to-bottom, but alternate pixel lines are processed in opposite directions. This technique attempts to reorient any worms so that they appear as horizontal lines in uniform gray areas of the image and are thus less obtrusive; however they are still present to the same degree as when the conventional raster scan is used.

Another known method, described in Japanese Laid-Open Patent HEI 3-151762/91, of minimizing the appearance of worms also varies the processing sequence from the conventional raster pattern. In accordance with one embodiment, the processing direction for each image line is selected based on the output of a random number generator or noise pattern generator which is quantized to yield a stream of "1's" and "0's". Pixel processing for each line is therefore performed left-to-right (in response to a "1") or right-to-left (in response to a "0") in a random pattern. In accordance with another known embodiment, pixels in image lines are processed left-to-right and right-to-left in predetermined periodic patterns, e.g., two left-to-right scans, followed by two right-to-left scans, and so on. While these prior processing order techniques reduce the size of the worms, the worms are still visible in the halftoned image.

Commonly assigned, co-pending patent application Ser. No. 08/269,708, filed Jul. 1, 1994 describes a method and apparatus which varies the processing direction from line-to-line to minimize the presence of worm-type artifacts in a halftoned image. Using this technique an adaptive processing direction technique is utilized wherein the processing direction of each line in the image is dependent on the content of the image. More particularly, the processing direction of each line in the image is dependent upon the grayscale value and/or the quantization error associated with one or more pixels of a previously processed line in the image.

The First Embodiment

Referring to FIG. 11, the first embodiment of the present invention is illustrated. As noted above, only every other pixel or the alternate pixels on each row are processed by error diffusion. As shown therein, in the odd numbered rows only the odd column pixels and in the even numbered rows only the even column pixels are processed. These pixels will be referred to as the selected pixels. More specifically, in this error diffusion technique, each selected pixel is processed by comparing its value to a predetermined threshold where the pixel "value" is the original grayscale value plus error adjustments resulting from the previous processing of other pixels. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

As discussed above, the direction of error diffusion can be determined by various methods. FIGS. 4A and 4B are illustrative examples of error diffusion in the right-to-left and left-to-right directions.

This "diffusion" process is illustrated in FIG. 11 where the pixel being processed is depicted as pixel 1501. As noted above, only every other pixel is processed. Accordingly, there is no error diffusion processing of the unselected pixels. In the illustrated arrangement, the error resulting from the processing is spread to a neighboring pixel 1502 to the right of the processed pixel 1501 (skipping the pixel immediately adjacent thereto), to the two neighboring pixels 1503, 1506 on the next line of binary pattern pixels (skipping the pixel immediately below pixel 1501), and to the three neighboring pixels on the following line 1504, 1505, 1507. Before being added to the neighboring pixels, the error value is multiplied by a proportionality constant. The values of these constants, q1, q2, q3, q4, q5 and q6, are arranged such that q1 q2+q3+q4+q5+q6=1. For example, the following weights can be used: q1=7/16, q2=8/32, q3=1/32, q4=5/32, q5=8/32 and q6=3/32. While these values are preferred, one of ordinary skilled in the art could develop other useful values. After pixel 1501 has been processed, the neighboring pixel 1502 to the right of pixel 1501 is processed by adding the proportionalized error value to the pixel value and processing it in the same manner as pixel 1501. After each pixel in a line has been processed in this manner, the next line in the image is processed in the same manner. Of course, it will be appreciated that the error may be diffused to additional lines.

The diffusion process in the case where the pixel processing takes place in the right-to-left direction is illustrated in FIG. 11 where the pixel 1601 is processed. In the illustrated arrangement, the error resulting from the processing is spread to the neighboring pixel 1602 to the left of the processed pixel 1601, to the two neighboring pixels 1603, 1606 on the next line, and to the three neighboring pixels on the following line 1604, 1605, 1607 of binary pattern pixels. Before being added to the neighboring pixels, the error value is also multiplied by a proportionality constant. The values of these constants, q1, q2, q3, q4, q5 and q6, are arranged such that q1+q2+q3+q4+q5+q6=1. For example, the following weights can be used: q1=7/16, q2=8/32, q3=1/32, q4=5/32, q5=8/32 and q6=3/32. While these values are preferred, one of ordinary skilled in the art could develop other useful values. After pixel 1601 has been processed, the neighboring pixel 1602 to the right of pixel 1601 is processed by adding the proportionalized error value to the pixel value and processing it in the same manner as pixel 1601.

Refer now to FIG. 5 which is an illustrative schematic block diagram that shows an error diffusion circuit modified in accordance with the principles of the invention. While the block diagram in FIG. 5 is preferred, persons of ordinary skill in the art who have read this description will recognize that various modification and changes may be made therein.

The error diffusion circuit receives a stream 500 of grayscale image pixels represented by digital words from an imaging device (not shown) in a conventional manner. The stream of image pixels are entered serially into a conventional input buffer 502. Buffer 502 is, in general, of sufficient size to store incoming image pixel words for an entire line of pixels.

Buffer 502 is, in turn, controlled by buffer control circuit 510 (as indicated schematically by arrow 512) to output every other or alternately stored values, in line order, to both the summing circuit 506 and to the arithmetic or logic circuit 514. As noted above, in the preferred embodiment, in the odd numbered lines, the odd column pixels are outputted and in the even numbered lines, the even pixels are outputted in response to buffer control 510. The summing circuit 506 is used to subtract the "error" values produced by the processing of previous pixels as will be described further below. The arithmetic or logic circuit 514 is used to control the processing direction, in accordance with any of the techniques described above. In particular, under control of the buffer control circuit 510 (this control is schematically illustrated as arrow 512), buffer 502 can serially output the stored pixel data either in a "left-to-right" order (last-in, first-out) or can output the stored pixel data in a "right-to-left" order (first-in, first-out).

The stored input data produced at the output 504 of input buffer is applied to the threshold circuit 528 by way of summing circuit 506 and line 508. The output of threshold circuit 528 is a quantized binary image (comprised of "0's" and "1's") which is produced by comparing the pixel values (each pixel "value" comprises the original input image value and "error" adjustments introduced by summing circuit 506) to a predetermined, fixed threshold value and outputting a "1" if the pixel value is greater than the threshold and outputting a "0" if the pixel value is less than or equal to the threshold value. Illustratively, the threshold circuit 528 may use a fixed threshold value such as 0.5 (for a grayscale value range between 0 and 1).

The quantized binary signal generated by the threshold circuit 528 is applied, via output line 532, to a second summing circuit 530 which subtracts the unquantized input signal on line 508 from the quantized output from threshold circuit 528 on line 532 to generate a quantization error value. The quantization error value is applied to filter circuit 522. The filter circuit 522 multiplies the error value by proportionality coefficients to generate the diffused error values, one of which will be added to the next pixel to be processed by summing circuit 506 and the rest of which are stored in error buffer 518 to be added to pixels during processing of the next and following lines of pixels.

Error buffer 518 is also controlled by buffer control circuit 510 (as indicated schematically by arrow 516) to output selected stored values to both summing circuit 506 and to the arithmetic or logic circuit 514 (via output line 524). Under control of the buffer control circuit 510, error buffer 518 can serially output the stored pixel data either in a "left-to-right" order (last-in, first-out) or can output the stored pixel data in a "right-to-left" order (first-in, first-out) in order to match the error data with the input data being shifted out of input buffer 502.

During processing of a line of pixels, buffer control circuit 510 controls both input buffer 502 and error buffer 518 to sequentially provide an input pixel value from buffer 502 to summing circuit 506 and an error value from error buffer 518 to summing circuit 506. Summing circuit then provides sequentially error-diffused values to threshold circuit 528 which generates the quantized output. The output of the threshold circuit 528 is also provided to the output buffer 534 which is also controlled by buffer control circuit 510. Output buffer 534 can output a serial stream of binary pixels for provision to the printing device on line 536.

Predistortion Processing
Second Embodiment

Refer first to FIGS. 13-A and 13-B, which illustrate operation of the second embodiment of the invention. Instead of processing every pixel as done with conventional techniques, only every other pixel is processing. The pixels to be processed are selected in a manner as described hereinabove. Additionally, instead of processing source data in accordance with a transfer function $f^1(x)$, which produces the linear response shown in FIG. 12, I utilize a different form of function $g(x)$ a representative version of which appears in FIG. 13-A. This function, when applied to source data, modifies it such that halftone processing will produce a raster whose final printed appearance exhibits the variations of the normalized value (100–percent dot coverage) shown as h(x)=f(g(x)) in FIG. 13-B (since the printer function f(x) operates not on source data x, but on data that has been predistorted by g(x)). Specifically, the highlight and upper midtone regions will be rendered at a lighter density than the corresponding regions of the source image, while the shadow and lower midtone regions are rendered at a darker density.

$$\text{Percent dot coverage} = 00 \times \frac{1 - 10^{-D_T/n}}{1 - 10^{-D_S/n}},$$

where $D_T$=Density of the screened area, $D_S$=Density of the solid area, n=Constant for the light scattering properties of paper, and $D_T$ and $D_S$ are measured relative to paper.

Suitable transform functions to implement this aspect of the invention are most conveniently based on the printer functionf(x), which, it will be recalled, relates the gray scale of incoming source data to the gray scale at which it will actually be rendered on the printer. A preferred transform function g(x) is:

$$g(x)=N-f(N-x)$$

where x is the gray scale corresponding to brightness or reflectance of a source data point expressed as a numerical value; N is the highest numerically expressed gray-scale density at which the source data is represented (e.g., in an 8-bit gray scale, N=255), corresponding to zero print gray scale; and f is the printer function.

It is also possible to parameterize the function g(x) in order to obtain a family of transform curves that offer the user greater control over output (i.e., the appearance of the final image in accordance with h(x)). Such control may be necessary to achieve visually optimal output over a variety of printing conditions, halftone-processing algorithms and image types, given the complex relationship between actual density patterns and visual perception thereof. Preferably, the function g(x) is parameterized using a weighting factor w, so that the family of available functions is:

$$g(x)=2w[N-f(N-x)-x]+x$$

where $0 \leq w \leq 1$. As shown in FIG. 13-B, the result is a family of curves. Curve c illustrates the case w=0.5, so that h(x)= f(g(x)) as discussed previously. Curve a corresponds to w=1, which produces an output h(x) equivalent to the g(x) function; curve e corresponds to the opposite case, where w=0, producing an output corresponding to an unmodified f(x); and curves b and d represent intermediate cases.

A representative hardware implementation of this aspect of the invention appears in FIG. 15. As shown in that figure, multibit image data (arriving, for example, from a digital scanner that samples the density of a source document in discrete steps and over a fixed range of gray-scale values) arrives as a stream of N-bit values and accumulates in a data buffer 20. Every other pixel data in data buffer 20 is read out therefrom by pixel selector circuit 21. The selected data is then transferred to a filter 22, which modifies each N-bit density value according to the transform function described above. A user-actuated adjustment feature 24, which may be in the form of a slide switch or a digitally programmable input device, imposes a selected value of the weighting factor w on the transform filter function, thereby modulating its operation.

The modified N-bit image data is transferred to a halftone engine 26, which coverts the incoming data into a raster pattern of 1-bit elements according to a suitable halftone processing algorithm. The invention is suitably used in conjunction with a variety of such algorithms, including globally fixed-level thresholding, constrained-average thresholding, dynamic thresholding, orthographic tone-scale creation, so-called electronic screening algorithms, various dithering algorithms (including ordered dither techniques such as dispersed-dot dithering) and error-diffusion techniques.

The above-described form of filter function, which operates on the printer function, cannot be used with printer functions symmetrical with respect to the filter function, since application of the filter function would not produce the desired S-shaped, asymmetric output function h(x). For example, the above formulation of g(x) cannot be used in conjunction with clustered-dot dithering halftone algorithms, which result in printer functions symmetrical with respect to h(x). However, it is possible to utilize alternative mathematical constructs to produce the desired output function.

The raster output of halftone engine 26 is delivered to a conventional electronic printer 28, which applies ink or toner to a recording medium in accordance with the raster pattern.

Third Embodiment

The third embodiment of the present invention, in which the halftone algorithm is filtered instead of the image data, may be practiced in accordance with the hardware implementation illustrated in FIG. 15. In this case, a halftone filter 30 modifies halftone engine 26 such that the final halftone output is biased in accordance with the function g(x).

This aspect of the invention is most advantageously applied to array-based halftoning techniques that apply a predetermined (or slowly changing) series of values to incoming source data. The approach is therefore of particular use in conjunction with dithering arrangements. In accordance with this aspect of the invention, each array value is treated as a discrete intensity level, and a filter function applied thereto to obtain modified values. Because the array values represent (or translate into) thresholds rather than intensities, the inverse function g⁻(x), rather than g(x), is applied to the array values. Halftoning engine 26 applies the filtered dither array to selected pixel data as described above. As noted above, the selected pixel data comprises every other pixel data representing the source image. This may be implemented by pixel selector circuit 21 shown in FIG. 16.

Application of this technique is shown in FIGS. 14-A and 14-B. Since printed output densities of the printer follow the typical f(x) pattern, the dither array threshold values, to which source dam are compared, are generally arranged to reflect an opposite inherent bias f¹(x); in this way, when the comparison between input source data and dither-array threshold values is made, the overall output density will be approximately the same as the input density. In order to obtain an ultimate printed output, following dithering, that adheres to the desired f(g(x)) pattern (i.e., application of the earlier-described function g(x) to input source data), the values in the dither array are biased in accordance with the inverse function $g^{-1}(x)=N-f^{-1}(N-x)$ to produce curve c in FIG. 14-B; this curve is inverse to the desired output curve, to which the final image conforms as a result of thresholding against the inversely biased array values.

Once again, it is desirable to provide for adjustment of the transform function $g^{-1}(x)$ so that the user may select the degree of density modification to suit particular conditions. This is accomplished with the adjustment feature 24, which again applies the weight w to obtain a family of available transform functions:

$$g^{-1}(x)=x-2w[x-N+f^1(N-x)]$$

where $0 \leq w \leq 1$. Representative curves in accordance with this function are illustrated in FIG. 14. Once again, curve c illustrates the case w=0.5, which produces an ultimate output f(g(x)). Curve a corresponds to w=0, which reflects no dither modification; curve e produces an ultimate output equivalent to the g(x) function corresponding to w=1; and curves b and d represent intermediate cases.

As noted above, the values in the modified dither array may be directly compared with the source data values as halftone thresholds that determine whether corresponding raster points are to be colored or uncolored; or the dither array may instead be tiled onto those values on an iterative basis, augmenting the density value of each source pixel by the value of the applied dither array cell prior to comparison with a fixed threshold.

Dither Array Generation

Fourth Embodiment

As noted above, in accordance with the present, embodiment only every other pixel is processed. As shown in FIG. 17, only the pixels represented as A's are processed. The other pixels are not processed nor printed and set to a non-printing value of, for example, zero. If a conventional dither array generation process is performed, the pixels that are not to be processed i.e., those set to zero, may take on a printing value and printing may occur at that pixel. This would circumvent the benefits obtained by the present invention. Accordingly, it is proposed to modify the dither array generation process by obtaining a dither array whose elements correspond only to the pixels to be processed. As will be explained in detail below the dither array and intermediate arrays used to derive the dither array contain only enough elements to correspond to every other pixel processed. In other words, for an image dithered by a p×q dither array and represent by n×m pixels only every other pixel or n/2×m pixels are processed. Accordingly the dither array and any intermediate arrays contain 1×k elements in which each of the 1×k elements is in corresponding relation to only the n/2×m elements. The method and apparatus for developing the dither array will now be discussed.

Dither array generation may take place in the computer system shown in FIG. 1 and generally is done "off-line" before halftone operations begin. In this manner, the printer driver software 210 only has to perform the comparison of the image data with the dither array threshold values during processing of the image. FIG. 19A shows a typical starting pattern (called a "Prototype Binary Pattern") which can be used in accordance with the prior art void-and-cluster dither array generation method. A pattern such as that shown in FIG. 19A might, for example, be generated by taking the output of a white-noise generator and quantizing it to a pattern of binary "1's" and "0's" by comparing the white noise values to a fixed threshold and inserting a "1" where the noise value exceeds the threshold and inserting a "0" where the noise value is less then the threshold. The pattern shown in FIG. 19A actually consists of four identical tile patterns, 300, 302, 304 and 306. The Prototype Binary Pattern used as the starting point of the prior art dither array generation method would actually consist of one of these patterns, however, four are shown to illustrate how the patterns can be used to tile a two-dimensional image.

When the Prototype Binary Pattern shown in FIG. 19A is used with the prior art void-and-cluster method, the pattern is directly homogenized by removing pixels from the tightest clusters and placing them in the largest voids. However, it has been found that the quality of the output image produced using the generated dither array depends critically on the starting pattern that is used to begin the process. A pattern, such as pattern 300 shown in FIG. 3A, is not homogeneous to start with due to the coarse quantizing.

Consequently, in accordance with the principles of the invention a more homogeneous pattern is generated before further homogenization is performed by removing pixels from the tightest clusters and placing them in the largest voids. The generation of this more homogeneous starting pattern begins with an array which is filled with identical grayscale values. Each of the values represents a constant gray tone with a value less than one half of the total scale. For example, in an eight-bit per pixel system (with a maximum value of 255 for each pixel), each element of the array would be initially filled with the same number, which number has a value of less than 127.

If error diffusion is then applied to this constant gray input (called a "Prototype Gray Pattern"), a more homogeneous first binary pattern 308 as shown in FIG. 19B is produced. The increased homogeneity results in an even more homogeneous Initial Binary Pattern after void and cluster processing has been completed, which, in turn, results in a better output result. Note that in FIG. 19B the error-diffused pattern still consists of four separate patterns 308, 310, 320 and 322.

The error diffusion process used to process the Prototype Gray Pattern is applied to every other pixel as described hereinabove, as shown, for example, in FIG. 11. Accordingly a discussion of the error diffusion is omitted.

The binary pattern (hereinafter called the "Starting Binary Pattern") resulting from the application of the error diffusion process to the Prototype Gray Pattern can be used directly as the starting pattern for the prior art void-and-cluster processing homogenization step. However, it has been found that improved dither arrays are produced if additional corrections are made to the Starting Binary Pattern before void-and-cluster processing is performed. In accordance with the principles of the invention, another correction is made to the Starting Binary Pattern to account for "oversized" dots produced by printing devices such as inkjet or laser printers.

In particular, the conventional void-and-cluster dither array generation method assumes that the output pixels are square so that neighboring pixels abut each other with no overlap. This pixel shape is shown in FIG. 6 where the pixel assumed by the prior art void and cluster method is shown as square pixel 1003. However, many printing devices actually generate a circular dot such as dot 1002d, as shown in FIG. 9-B and discussed above. This diameter of this dot is generally larger than the square pixel area so that dots corresponding to adjacent pixels will overlap to eliminate all white spots in an "all-black" area. As mentioned hereinabove, that there is sufficient overlap of dots 1001d and 1002d that it is unnecessary to process or print the pixel 1004d disposed therebetween. Accordingly, dot 1001d is larger than the pixel it represents so that the overlap area is not taken into account in the void-and-cluster method. In accordance with the invention, in order to take this shaded area into account, three distinct overlap areas must be considered which are formed when the oversized area in FIG. 18 overlaps other pixels. Additionally, the void-and-cluster method must be arranged such that the Prototype Binary Pattern, the Prototype Gray Pattern and the Starting Binary Pattern contain the same number of elements as the number of pixels that are printed. For example, if there are n×m pixels, only every other pixel or n/2×m pixels are printed. Therefore these patterns contain only those elements which correspond to the n/2×m pixels. This is accomplished, in effect, by transposing the array for these patterns by, for example 45°, and shown in FIG. 18. Additionally, the shape and location of these three distinct areas is shown therein.

More particularly, FIG. 18 shows three "on" pixels, 600, 602 and 604, and the accompanying printer dots 606, 608 and 610 which would be used to represent the three pixel areas 600, 602 and 604. The overlap caused by the oversized printer dots results in three distinct area types can be used either singularly, or in combination, to correctly adjust adjacent areas for dot overlaps. These areas are illustrated as the shaded areas shown in FIG. 18. For example, first area type, 612, is designated as art "α" area. The next area type is area 614 designated as a "β" area, and the third area type (caused by an overlap of two dots) is area 616 called a "γ" area. The sizes of the α, β and δ areas are fixed for each particular type of printer and depend on the printer dot radius and the printer resolution. The dot radius for any particular printer can be determined by examining the dots produced by the printer under a microscope. Once the dot radius has been ascertained, a normalized radius ($r_o$) can be computed using the formula:

$$r_o = \frac{\text{measured dot radius}}{\left(\frac{1}{dpi}\right)}$$

where "dpi" is the "dots per inch" resolution of the printer. As noted above, the radius of the pixels, of which the present invention is directed to is generally in the range of $/dpi \leq r \leq \sqrt{2}/dpi$. Once $r_o$ has been calculated, the three areas, α, β and γ, can be determined according to the following formulas:

$$\alpha = 0.5 * r_o^2 * \sin^{-1}\left(\frac{1}{r_o\sqrt{2}}\right) +$$

$$0.25 * \left(1 - \tan\left(\sin^{-1}\left(\frac{1}{r_o\sqrt{2}}\right)\right)\right) \times \sqrt{2r_o^2 - 1} - 0.2$$

$$\beta = 0.125 * \pi * r_o^2 - 0.25 - \alpha$$

$$\gamma = 0.5 * r_o^2 * \cos^{-1}\left(\frac{1}{r_o}\right) - 0.5 * \sqrt{r_o^2 - 1} - \beta$$

FIG. 20A and 20B illustrate how corrections are made to the either the Prototype Binary Pattern (the white noise pattern used in the prior art void-and-cluster method) or the Starting Binary Pattern (the Prototype Gray Pattern after error diffusion has been applied) to account for oversized dots. Additionally those figures illustrate that these patterns have been transposed by 45°. FIG. 20A shows a section of the pattern, for example which might be a section of the pattern shown in either of FIGS. 19A or 19B which is generated assuming square pixels. The pattern comprises a rectangular array of "1's" and "0's" and the particular section of the array shown in FIG. 20A consists of mostly "0's" with three "1's" located in array elements 700, 702 and 704.

FIG. 20B shows the same array portion which has been corrected for effects of the oversized dots. For example array element 708 in FIG. 20B now has been adjusted by adding the value of "β" to the original value ("0"). The adjustment arises from the overlap area produced by the dot located in element 710. Accordingly, this value is changed from the original "0" value in the corresponding element 706 in FIG. 20A. Similarly, the values in the array elements surrounding the three "1's" are adjusted in accordance with the overlap areas produced by the oversized dots as illustrated in FIG. 20B. These adjustments impart "grayscale" values to the surrounding elements and tend to further refine the dot patterns. Due to the added grayscale values this pattern is hereinafter called a "Starting Gray Pattern".

In accordance with the principles of the invention, both the Starting Binary Pattern (as shown in FIG. 19B) and the Starting Gray Pattern (as shown in FIG. 20B) are then subjected to void-and-cluster processing to create an Initial Binary Pattern and an Initial Gray Pattern, respectively, by moving pixels from clusters to voids. It has been found that the additional adjustments as illustrated in FIGS. 19B and 20B further enhance the quality of the dither array generated by the inventive void-and-cluster method.

FIG. 21 is an illustrative flowchart of the inventive void and cluster method incorporating the improvements discussed above. Although the improvements are applied in the method illustrated in FIG. 21, it should be understood that any of the improvement steps can be applied independent of each other to generate an improved dither array. In particular, the inventive method starts in step 800 and proceeds to step 801 where the elements of the Gray Pattern are arranged to correspond to every other pixel (the selected pixels). As shown in FIG. 18 the Gray Pattern is transposed by approximately 45°, so that each element of the Gray Pattern array corresponds to each of the selected pixels. In step 802 the Prototype Gray Pattern is generated, illustratively using a constant value in each array element. Next, in step 804, an error diffusion process is applied to the Prototype Gray Pattern to generate the Starting Binary Pattern. It is noted that the Starting Binary Pattern array contains the same number of elements as the number of selected pixels.

In step 806, the Starting Binary Pattern is adjusted for oversized dot patterns as discussed above and shown in FIG. 20A and 20B to generate the Starting Gray Pattern. Next, in step 808, the Initial Binary Pattern and the Initial Gray Pattern are created from the Starting Binary Pattern and the Starting Gray Pattern, respectively, by moving pixels from clusters to voids in the manner discussed above in accordance with the prior art void-and-cluster method.

Finally, in step 810, threshold values are assigned to the dither array using the Initial Binary Pattern and the Initial Gray Pattern using the method discussed in detail in connection with FIGS. 22A–22C. The routine then finishes in step 812.

FIGS. 22A, 22B and 22C, when placed together, disclose an illustrative method for assigning threshold values to the dither array utilizing the Initial Gray Pattern and the Initial Binary Pattern. The disclosed method that is similar to that used in the conventional void-and-cluster-method, however, the method has been modified to use the Initial Gray Pattern to locate the voids and the clusters instead of the Initial Binary Pattern used in the prior art method. Since the Initial Gray Pattern has been adjusted for the effects of oversized dots, it produces a more accurate location for the tightest clusters and largest voids. In particular, the illustrated method has three phases. During Phase I (shown in FIG. 22A) the dither array elements from element numbers ("Ones"–1) to 0 are entered. During Phase II (shown in FIG. 22B) dither array elements from "Ones" to $$\left(\frac{lk}{2} - 1\right)$$

are added and in Phase III (shown in FIG. 22C) elements $$\left(\frac{lk}{2}\right)$$

to lk are entered.

In particular, the illustrative routine starts in step 900 and proceeds to step 902 where a Gray Pattern Array is loaded with the Initial Gray Pattern. The routine uses two arrays called a "Gray Pattern" array and a "Binary Pattern" array. These arrays have the same number of elements as the dither array (arbitrarily, they are taken to have l rows and k columns). In step 902, the Gray Pattern array is loaded with the values taken from the Initial Gray Pattern array generated as described above.

Next, in step 904, the Binary Pattern array is loaded with the Initial Binary Pattern array values generated as discussed above. Continuing to step 906, a variable "Ones" is set equal to the number of ones in the Binary Pattern, and, in step 908, a variable "Rank" is set equal to the value of the variable "Ones" minus "1".

In step 910, the variable "Rank" is checked to see if it is less than zero. This check determines whether Phase I of the threshold assignment routine has been completed. If the value of "Rank" is not less than zero, then the routine proceeds to step 912 in which the location of the tightest cluster in the Gray Pattern array is determined. As previously mentioned, this determination is made by using a two-dimensional Gaussian filter (described above). This filter takes into account the adjusted gray scale values in the Gray Pattern to locate the tightest cluster.

Then, in step 914, a binary "1" is removed from the Binary Pattern at the location determined in step 912 to form a New Binary Pattern. Subsequently, the value of the "Rank" variable is entered into the corresponding location in the dither array in step 916 to form the new threshold value.

In step 914, the removal of the "1" from the Binary Pattern forces a readjustment of the grayscale values because the α, β and γ values must be readjusted to take into account the fact that the "1" has been removed and a "0" has been inserted in its place. Consequently, in step 918, the Gray Pattern is recalculated from the New Binary Pattern produced by removing the "1" in step 914.

In step 920, the value of the "Rank" variable is decremented and the routine proceeds back to step 910 where a further check is made to determine whether the end of Phase I has been reached. If so, the routine proceeds, via off-page connectors 922 and 924, to Phase II, as shown in FIG. 22B. Alternatively, if, in step 910, the value of the "Rank" variable is not less than zero, then steps 912–920 are repeated and the routine continues in this matter until Phase I has been completed.

FIG. 22B shows the steps performed in Phase II of the inventive threshold assignment method. In particular, from off-page connector 924, the routines proceeds to step 926 in which the Gray Pattern array is initialized by loading it with the Initial Gray Pattern values determined previously. Similarly, in step 928 the Binary Pattern array is initialized by loading it with the Initial Binary Pattern values determined previously. In step 930 the value of the "Rank" variable is set equal to the value of the "Ones" variable.

Next, in step 932, a check is made to determine whether the value of the "Rank" variable is less than the number of rows times the number of columns divided by two $$\left(\frac{lk}{2}\right).$$

Since the value of the "Rank" variable will increase with each pass through the routine loop, the value of the "Rank" variable will eventually exceed the value $$\left(\frac{lk}{2}\right)$$

and the routine will proceed to Phase III of the threshold assignment method as indicated in step 932.

However, if, in step 932, it is determined that remaining "voids" need to be processed, the routine proceeds to step 934 where the location of the largest void in the Gray Pattern array is determined, again by using the two-dimensional Gaussian filter as described above.

Next in step 936 a binary "1" is inserted into the corresponding location in the Binary Pattern thereby replacing the original "0" to form a New Binary Pattern and, in step 938, the value of the "Rank" variable is entered into the corresponding location of the dither array.

The Gray Pattern array is then recalculated from the New Binary Pattern to adjust for the "0" to "1" replacement in step 936 and the value of the "Rank" variable is incremented by one in step 942. The routine then proceeds back to step 932 in which the value of the "Rank" variable is again checked to determine whether Phase II has been completed. If Phase II has not been completed, steps 934–942 are repeated. At the completion of Phase II as indicated by the value of the "Rank" variable exceeding $$\left(\frac{lk}{2}\right),$$

the routine process, via off-page connectors 944 and 946, to Phase III of the threshold assignment routine as shown in detail in FIG. 22C.

Referring to FIG. 22C, the routine proceeds to from off-page connector 946 to step 948 where the definition of "minority pixels" is changed from "1" to "0" (as previously mentioned, during Phase II the arrays are being filled with binary "1s" and thus binary "1s", which were originally the "minority" pixel, have now become the "majority" pixels). The routine then proceeds to step 950 where the value of the "Rank" variable is checked to see if it is less than the number of rows times the number columns (lk). During Phase III, the value of the "Rank" variable increases and, thus, it will eventually equal lk, at which point the routine will finish. As will now be appreciated, each of the l×k elements of the dither array now correspond to each of the n/2×m selected pixels.

However, if, in step 950, a determination is made that the value of the "Rank" variable is less than lk, then the routine proceeds to step 952 where the location of the tightest cluster in the Gray Pattern array is determined, again using the previously-described Gaussian filter. Next, in step 954, a "1" is inserted into the Binary Pattern at the location determined in step 952 to form a New Binary Pattern, and, in step 956, the value of the "Rank" variable is entered into the corresponding location in the dither array.

The Gray Pattern array is recalculated from the New Binary Pattern in Step 958 and the value of the "Rank" variable is incremented in step 960. The routine then proceeds back to step 950 to make a determination whether Phase III has been completed. If so, the routine ends in step 962, if not, steps 952 through 960 are repeated until all elements of the dither array have been assigned a threshold value.

While the examples discussed above focused on only one color plane, one of ordinary skill in the art will appreciate that these techniques could be applied to each of the color planes. In other words, there techniques could be applied for color printing.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method of converting a continuous-tone image, represented as an array of electronically encoded n×m pixels comprising n rows of m pixels each specifying a gray-scale value, into a binary raster suitable for electronic printing, n and m being positive integers, the method comprising the steps of:
   A. identifying a series of pixels corresponding to a linear segment of the image, the identified pixels comprising one of
      (1) odd ones of the m pixels on corresponding odd ones of the n rows of pixels and even ones of the m pixels on corresponding even ones of the n rows of pixels; and
      (2) even ones of the m pixels on corresponding odd ones of the n rows of pixels and odd ones of the m pixels on corresponding even ones of the n rows of pixels;
   B. processing the identified pixels, in a sequence corresponding to movement along the segment in a predetermined direction, to convert the pixels into binary raster values; and
   C. repeating the identification and processing steps until the image has been fully processed.

2. The method of claim 1, wherein step B comprises of steps of:
   B1. comparing the value of the (i,j) one of the identified pixels with a threshold value, wherein $1 \leq i \leq n$ and $1 \leq j \leq m$;
   B2. calculating an error value defined as a difference between the value of the (i,j) identified pixel and the threshold value; and
   B3. adjusting the value at least one succeeding identified pixel to be processed in accordance with at least a portion of the error value.

3. The method of claim 2, wherein the at least one succeeding identified pixel comprises at least one identified pixel on the i+1 row and at least one identified pixel on the i+2 row.

4. The method of claim 2, wherein the at least one succeeding identified pixel comprise a j+2 pixel on the row i, a j−1 pixel on a row i+1, a j+1 pixel on the row i+1, a j+2 pixel on the row i+2, j pixel on the row i+2 and a j−2 pixel on the row i+2.

5. The method of claim 1, further comprising the step of outputting a dot for each of the binary raster values, the dot having a radius r in the range of $/dpi \leq r \leq \sqrt{2}/dpi$, and dpi is a resolution of the pixels in dots per inch.

6. An image-processing system for converting a continuous-tone image into a binary raster suitable for printing, the apparatus comprising:
   memory means for storing an array of electronically encoded n×m pixels each representing a gray-scale value, wherein n and m are positive integers;
   reading means for reading every other electronically encoded pixel from said memory means; and
   halftoning means for iteratively processing series of pixels read by said reading means each corresponding to a linear segment of the image, in a sequence representative of movement along the segment in a predetermined direction, so as to produce binary raster values therefrom.

7. The system of claim 6, wherein said halftoning means comprises:
   a comparator for comparing the values of the (i,j) one of the identified pixels with a threshold value, wherein $1 \leq i \leq n$ and $1 \leq j \leq m$;
   a calculating circuit for calculating an error value defined as a difference between the value of the (i,j) identified pixel and the threshold value; and
   adjusting circuit for adjusting the value of at least one succeeding identified pixel to be processed in accordance with at least a portion of the error value.

8. The system of claim 7, wherein the at least one succeeding identified pixels comprises at least one identified pixel on the i+1 row and at least one identified pixel on the i+2 row.

9. The system of claim 7, wherein the at least one succeeding identified pixel comprises a j+2 pixel on the row i, a j−1 pixel on a row i+1, a j+1 pixel on the row i+1, a j+2 pixel on a row i+2, a j pixel on the row i+2 and a j−2 pixel on the row i+2.

10. The system of claim 6, further comprising a binary output means for outputting a dot for each of the binary raster values, the dot having a radius r in the range of $/dpi \leq r \geq \sqrt{2}/dpi$, and dpi is a resolution of the pixels in dots per inch.

11. A printer for printing a continuous-tone image as patterns of monochrome dots on a print medium, the printer comprising:
   digitizing means responsive to the continuous-tone image for generating a stream of electronically m×n encoded pixel values, each representing a grayscale value of a portion of the continuous-tone image;
   memory means responsive to the stream of electronically encoded pixel values for storing the electronically encoded pixel values in a plurality of linear segments, each linear segment having a start and an end and comprising pixel values that represent contiguous portions of the continuous-tone image, wherein n and m are positive integers;
   reading means for reading every other electronically encoded pixel from said memory means;
   halftoning means controllable to process each pixel value corresponding to the electronically encoded pixels read by said reading means in each of the plurality of linear segments in a start to end sequence and in an end to start sequence to generate output results; and
   a print mechanism responsive to the output results for generating the patterns of monochrome dots on the print medium.

12. The printer of claim 11, wherein said halftoning means comprises:

a comparator for comparing the values of the (i,j) one of the identified pixels with a threshold value, wherein $1 \leq i \leq n$ and $1 \leq j \leq m$;

a calculating circuit for calculating an error value defined as a difference between the value of the (i,j) identified pixel and the threshold value; and adjusting circuit for adjusting the value of at least one succeeding identified pixel to be processed in accordance with at least a portion of the error value.

13. The printer of claim 12, wherein the at least one succeeding identified pixel comprises at least one identified pixel on the i+1 row and at least one identified pixel on the i+2 row.

14. The printer of claim 12, wherein the at least one succeeding identified pixel comprises a j+2 pixel on the row i, a j−1 pixel on a row i+1, a j+1 pixel on the row i+1; a j+2 pixel on a row i+2, a j pixel on the row i+2 and a j−2 pixel on the row i+2.

15. The printer of claim 12, wherein each of the monochrome dots has a radius r in the range of $/dpi \leq r \leq \sqrt{2}/dpi$, and dpi is a resolution of the pixels in dots per inch.

16. A computer system comprising:

a memory for storing data and programs;

a central processing unit responsive to programs stored in the memory for controlling and coordinating the operation of the computer system;

digitizing means responsive to a continuous-tone image for generating a stream of electronically encoded pixel values, each representing a gray-scale value of a portion of the continuous-tone image;

memory means responsive to the stream of electronically encoded pixel values for storing the electronically encoded pixel values in a plurality of linear segments, each linear segment having a start and an end and comprising pixel values that represent contiguous portions of the continuous-tone image;

reading means for reading every other pixel from said memory means;

halftoning means controllable to process each pixel value corresponding to the electronically encoded pixel read by said reading means in each of the plurality of linear segments in a start to end sequence and in an end to start sequence to generate output results; and a printer responsive to the output results for printing patterns of monochrome dots on a print medium to generate a halftoned image.

17. The computer system of claim 16, wherein said halftoning means comprises:

a comparator for comparing the values of the (i,j) one of the identified pixels with a threshold value, wherein $1 \leq j \leq n$ and $1 \leq j \leq m$;

a calculating circuit for calculating an error value defined as a difference between the value of the (i,j) identified pixel and the threshold value; and adjusting circuit for adjusting the value of at least one succeeding identified pixel to be processed in accordance with at least a portion of the error value.

18. The computer system of claim 17, wherein the at least one succeeding identified pixel comprises at least one identified pixel on the i+1 row and at least one identified pixel on the i+2 row.

19. The computer system of claim 17, wherein the at least one succeeding identified pixel comprises a j+2 pixel on the row i, a j−1 pixel on a row i+1, a j+1 pixel on the row i+1, a j+2 pixel on a row i+2, a j pixel on the row i+2 and a j−2 pixel on the row i+2.

20. The printer of claim 16, wherein each of the monochrome dots has a radius r in the range of $/dpi \leq r \leq \sqrt{2}/dpi$, and dpi is a resolution of the pixels in dots per inch.

* * * * *

UNITED STATES PATENT AND TRADEMARK OFFICE
CERTIFICATE OF CORRECTION

PATENT NO.    : 5,592,592
DATED         : January 7, 1997
INVENTOR(S)   : Joseph Shu It is certified that errors appear in the above identified patent and that said Letters Patent is hereby corrected as shown below:

Abstract, line 4, insert --1-- before "/dpi≤r≤√2/dpi".

Column 9, line 35, insert --1-- before "/dpi≤r≤√2/dpi".

Column 27, line 65, insert --1-- before "/dpi≤r≤√2/dpi".

Column 28, line 38, change "/dpi≤r≥√2/dpi" to --1/dpi≤r≤√2/dpi--.

Column 29, line 20, insert --1-- before "/dpi≤r≤√2/dpi".

Column 30, line 32, insert --1-- before "/dpi≤r≤√2/dpi".

Signed and Sealed this

Eighth Day of July, 1997

Attest:

BRUCE LEHMAN

*Attesting Officer*    *Commissioner of Patents and Trademarks*